(12) United States Patent
Hosek et al.

(10) Patent No.: US 10,994,426 B2
(45) Date of Patent: May 4, 2021

(54) ROBOTIC MANIPULATOR WITH SUPPLEMENTARY DAMPING

(71) Applicant: Persimmon Technologies, Corp., Wakefield, MA (US)

(72) Inventors: Martin Hosek, Lowell, MA (US); Dennis Poole, East Derry, NH (US)

(73) Assignee: Persimmon Technologies Corporation, Wakefield, MA (US)

( * ) Notice: Subject to any disclaimer, the term of this patent is extended or adjusted under 35 U.S.C. 154(b) by 326 days.

(21) Appl. No.: 15/484,515

(22) Filed: Apr. 11, 2017

(65) Prior Publication Data
US 2017/0291314 A1    Oct. 12, 2017

Related U.S. Application Data

(60) Provisional application No. 62/340,638, filed on May 24, 2016, provisional application No. 62/320,775, filed on Apr. 11, 2016.

(51) Int. Cl.
| | |
|---|---|
| B25J 19/00 | (2006.01) |
| B25J 9/10 | (2006.01) |
| B25J 9/04 | (2006.01) |
| B25J 9/00 | (2006.01) |
| B25J 11/00 | (2006.01) |
| F16F 9/30 | (2006.01) |

(52) U.S. Cl.
CPC ......... *B25J 19/0091* (2013.01); *B25J 9/0012* (2013.01); *B25J 9/0021* (2013.01); *B25J 9/042* (2013.01); *B25J 9/104* (2013.01); *B25J 11/0095* (2013.01); *F16F 9/306* (2013.01); *Y10S 901/21* (2013.01)

(58) Field of Classification Search
CPC .............................. B25J 19/0091; F16F 9/306
See application file for complete search history.

(56) References Cited

U.S. PATENT DOCUMENTS

| | | | | |
|---|---|---|---|---|
| 5,102,289 | A * | 4/1992 | Yokoshima | ............. F16F 7/108 188/379 |
| 5,335,463 | A | 8/1994 | Reinhall | ....................... 52/167.1 |
| 5,682,795 | A | 11/1997 | Solomon et al. | |
| 5,691,037 | A | 11/1997 | McCutcheon | ................ 428/172 |
| 5,744,728 | A | 4/1998 | Suita et al. | |
| 6,298,963 | B1 | 10/2001 | Kim | .............................. 188/379 |
| 9,149,936 | B2 * | 10/2015 | Hosek | ...................... B25J 9/042 |
| 2003/0137219 | A1 * | 7/2003 | Heiligensetzer | ....... B25J 13/084 310/328 |

(Continued)

*Primary Examiner* — Terence Boes
(74) *Attorney, Agent, or Firm* — Harrington & Smith

(57) ABSTRACT

An apparatus including a plurality of robot arm links movably connected to one another, where a first one of the robot arm links includes a frame, where the frame has a first end movably connected onto a second one of the robot arm links; and at least one vibration damper arrangement on the frame of the first robot arm link, where the at least one vibration damper arrangement includes at least one viscoelastic element connected to the frame of the first robot arm link by a connection such that, as the frame of the first robot arm link experiences vibrations, the at least one viscoelastic element dampens the vibrations in the frame of the first robot arm link based upon viscoelasticity and the connection of the at least one viscoelastic element to the frame of the first robot arm link.

19 Claims, 25 Drawing Sheets

(56) References Cited

U.S. PATENT DOCUMENTS

| | | |
|---|---|---|
| 2003/0233171 A1 | 12/2003 | Heiligensetzer |
| 2005/0080511 A1* | 4/2005 | Takenaka ............... B25J 13/085 |
| | | 700/245 |
| 2013/0045369 A1* | 2/2013 | Takemura ............... B32B 5/142 |
| | | 428/188 |
| 2013/0294877 A1* | 11/2013 | Hosek ................... H01L 21/683 |
| | | 414/744.5 |
| 2014/0014219 A1* | 1/2014 | Takemura ............... B25J 9/0012 |
| | | 138/140 |
| 2014/0144736 A1 | 5/2014 | Browne ........................ 188/268 |
| 2015/0251323 A1* | 9/2015 | Kim ..................... B25J 11/0095 |
| | | 294/213 |
| 2018/0156296 A1 | 6/2018 | Alexander |

* cited by examiner

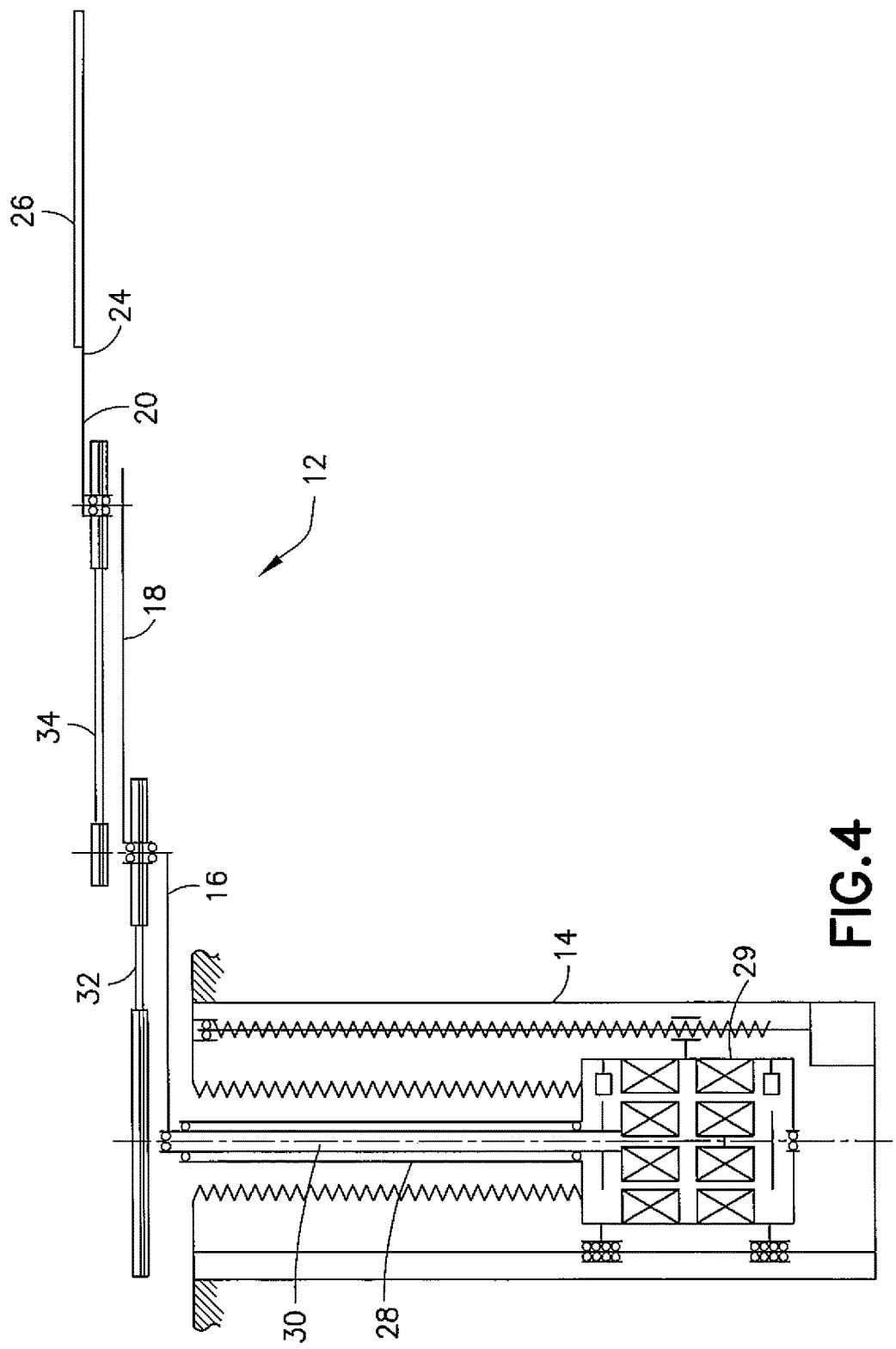

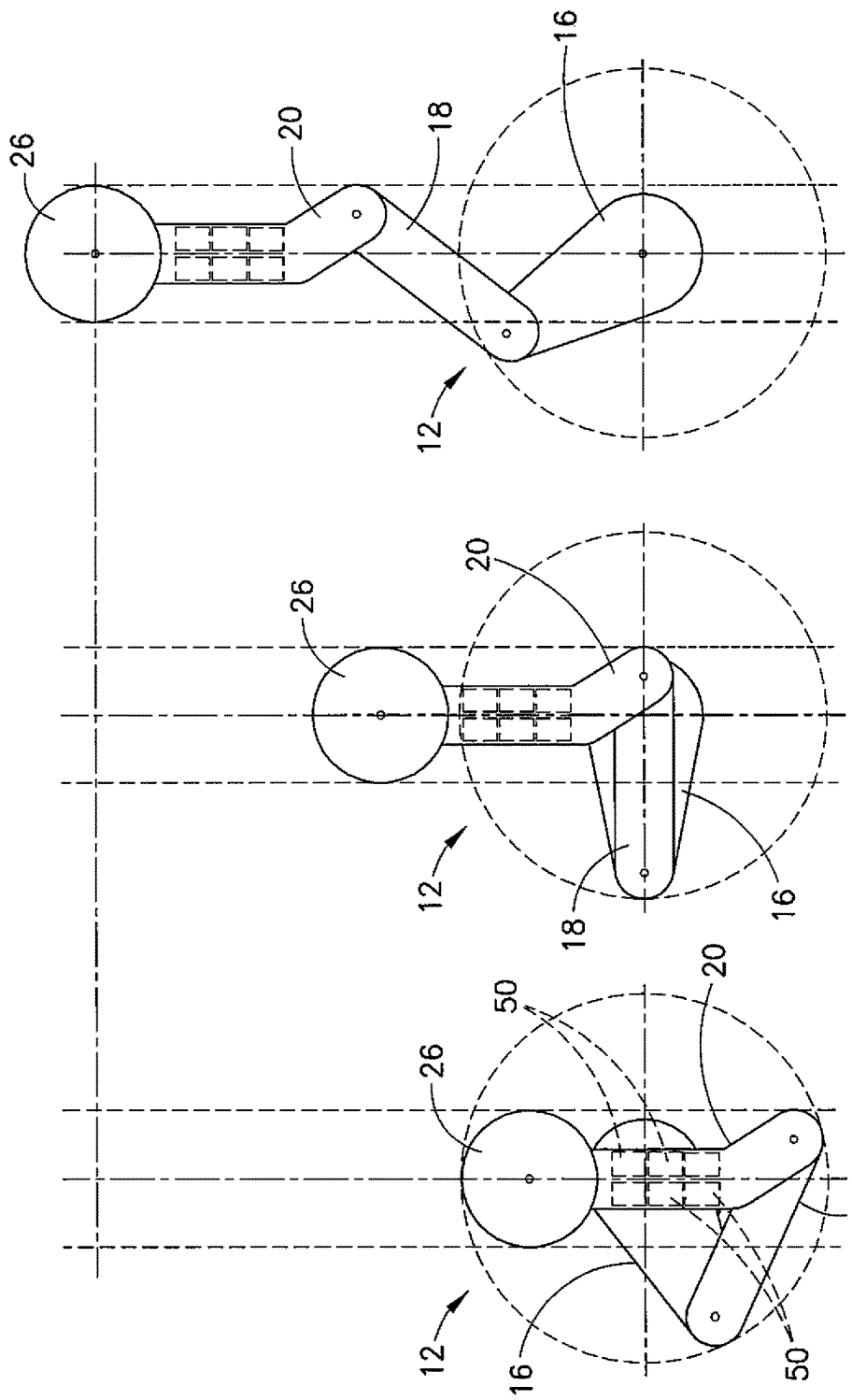

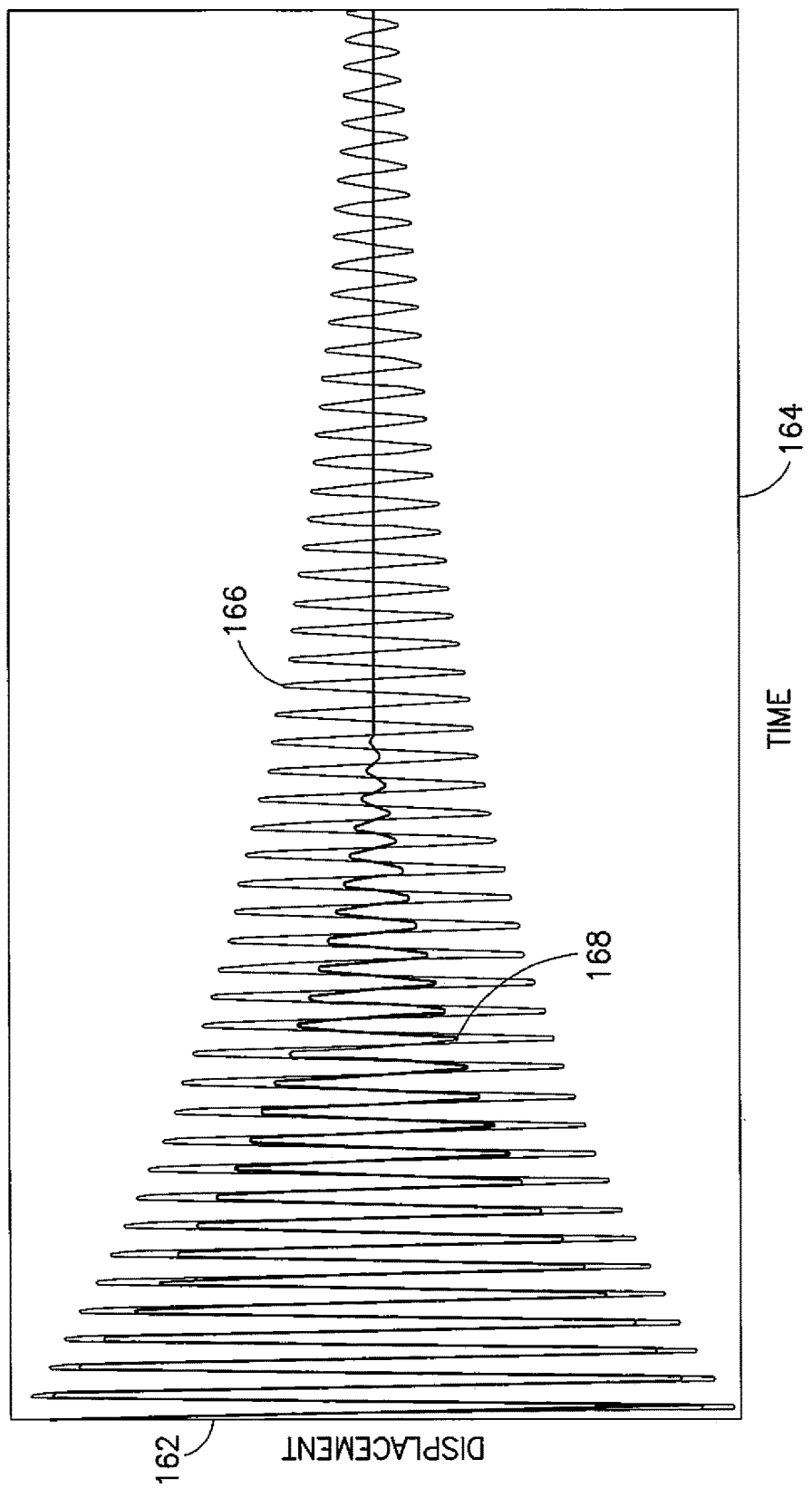

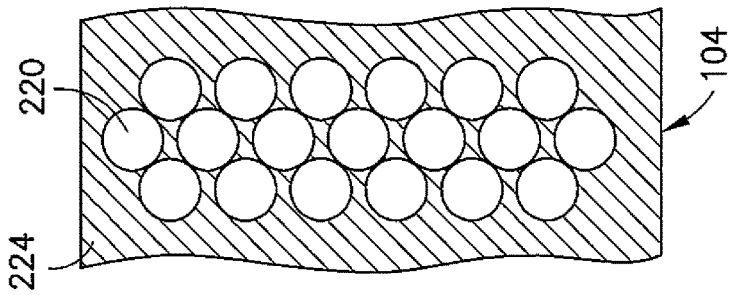
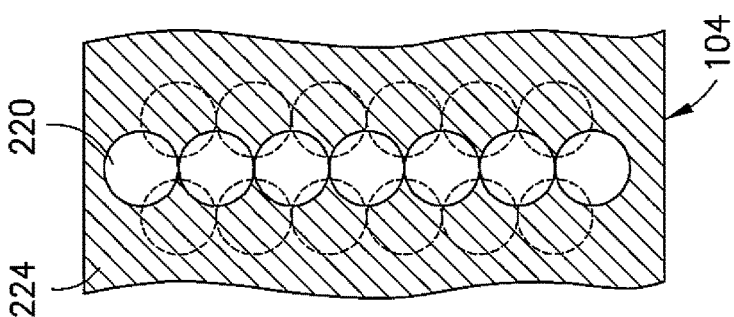
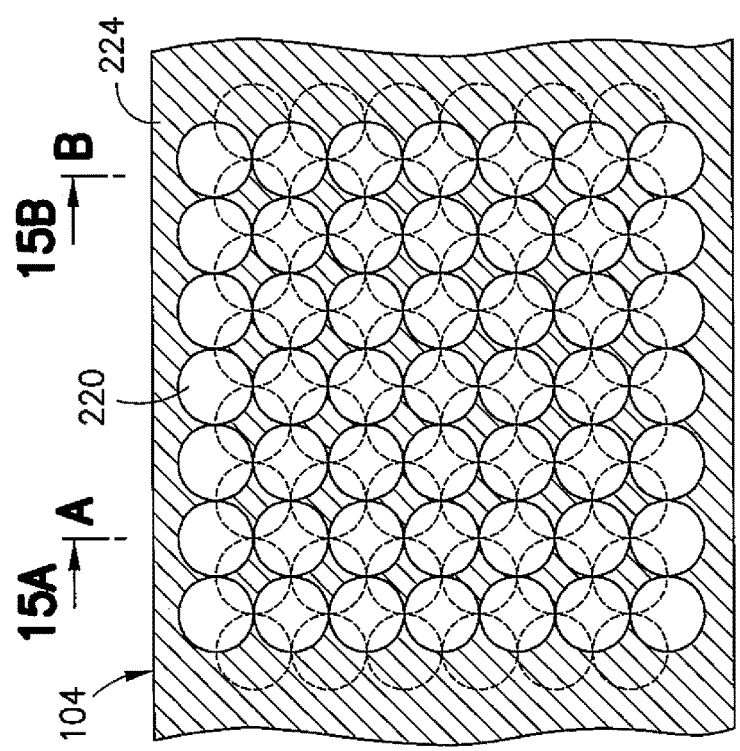

(1)

ROBOTIC MANIPULATOR WITH SUPPLEMENTARY DAMPING

CROSS REFERENCE TO RELATED APPLICATIONS

This application claims priority under 35 USC 119(e) to U.S. provisional patent application No. 62/340,638 filed May 24, 2016 and U.S. provisional patent application No. 62/320,775 filed Apr. 11, 2016, which are hereby incorporated by reference in their entireties.

BACKGROUND

Technical Field

The exemplary and non-limiting embodiments relate generally to a robot and, more particularly, to damping vibrations.

Brief Description of Prior Developments

U.S. Pat. No. 9,149,936 discloses an example of a robot used in a substrate transport apparatus. U.S. patent publication No. 2013/0294877 A1 discloses using windings of a solenoid or actuator at an end effector to dampen and control rotation of a member.

SUMMARY

The following summary is merely intended to be exemplary. The summary is not intended to limit the scope of the claims.

In accordance with one aspect, an example embodiment is provided in an apparatus comprising a plurality of robot arm links movably connected to one another, where a first one of the robot arm links comprises a frame, where the frame has a first end movably connected onto a second one of the robot arm links; and at least one vibration damper arrangement on the frame of the first robot arm link, where the at least one vibration damper arrangement comprises at least one viscoelastic element connected to the frame of the first robot arm link by a connection such that, as the frame of the first robot arm link experiences vibrations, the at least one viscoelastic element dampens the vibrations in the frame of the first robot arm link based upon viscoelasticity and the connection of the at least one viscoelastic element to the frame of the first robot arm link.

In accordance with another aspect, an example method comprises attaching at least one vibration damper arrangement to a frame of a first robot arm link, where the at least one vibration damper arrangement comprises at least one viscoelastic element connected to the frame of the first robot arm link by a connection such that, as the frame of the first robot arm link experiences vibrations, the at least one viscoelastic element dampens the vibrations in the frame of the first robot arm link based upon viscoelasticity and the connection of the at least one viscoelastic element to the frame of the first robot arm link; and connecting a first end of the frame of the first robot arm link to a second robot arm link such that the frame of the first robot arm link is configured to move relative to the second robot arm link.

In accordance with another aspect, an example method comprises moving a first robot arm link relative to a second robot arm link, where the first robot arm link comprises a frame having a first end movably connected to the second robot arm link; and damping vibrations in the frame of the first robot arm link comprising at least one vibration damper arrangement on the frame of the first robot arm link including at least one viscoelastic element connected to the frame of the first robot arm link by a connection such that, as the frame of the first robot arm link experiences vibrations, the at least one viscoelastic element dampens the vibrations in the frame of the first robot arm link based upon viscoelasticity and the connection of the at least one viscoelastic element to the frame of the first robot arm link.

In accordance with another aspect, an example embodiment is provided in an apparatus comprising a first robot arm link; and a second robot arm link movably connected to the first robot arm link, where the second robot arm link comprises a frame member having a first end movably connected to the first robot arm link and an opposite second end connected to another member, where the frame member comprises a plurality of viscoelastic elements located inside a core of the frame member, where the plurality of viscoelastic elements are at least partially embedded inside the core, where the core has been at least partially molded or cast onto the plurality of viscoelastic elements to thereby form a connection between the plurality of viscoelastic elements and the core such that, as the core experiences vibrations, the at least one viscoelastic element dampens the vibrations in the core based upon viscoelasticity and the connection of the at least one viscoelastic element to the core.

BRIEF DESCRIPTION OF THE DRAWINGS

The foregoing aspects and other features are explained in the following description, taken in connection with the accompanying drawings, wherein:

FIG. 4 is a diagram illustrating an example of a drive used with the example of FIGS. 1-3;

FIGS. 5A-5C are schematic top diagrams illustrating movement of the robot arm shown in FIGS. 1-4;

FIG. 9 is a diagram illustrating vibrations with and without the damper arrangements described herein;

FIGS. 15, 15A and 15B are cross sectional views of another example embodiment;

DETAILED DESCRIPTION OF EMBODIMENTS

Figure 1:
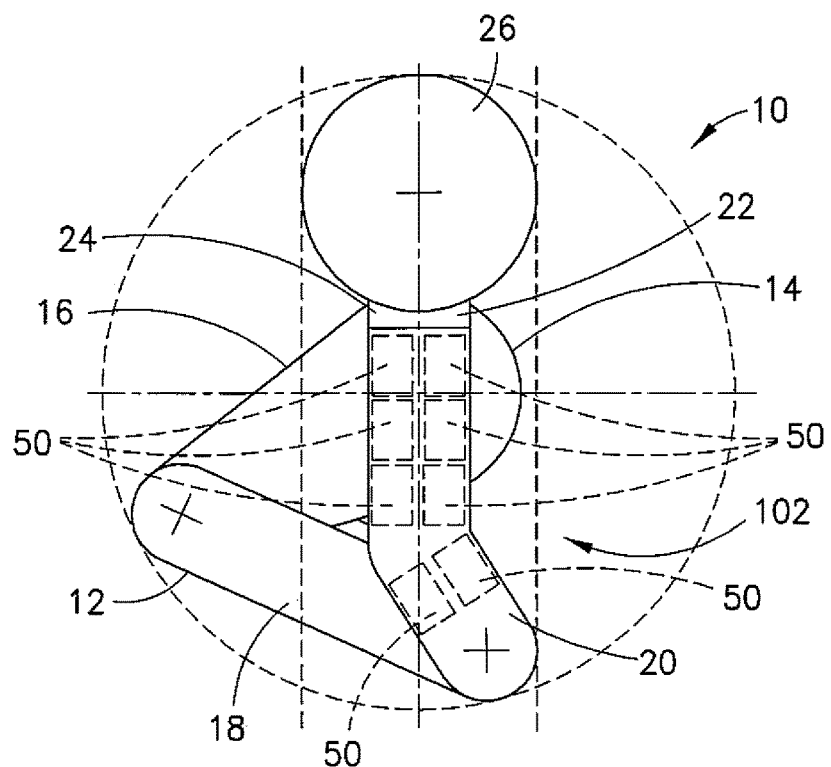
FIG. 1 is a schematic top view of an example embodiment.

Referring to FIG. 1, there is shown a schematic top view of a robot 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

Features as described herein may be used with a robot arm that employs integrated damping arrangements to reduce vibration of the end-effector and the payload carried by the arm. This concept of using integrated damping arrangements may be extended to the structure of a robot in general.

Figure 2:
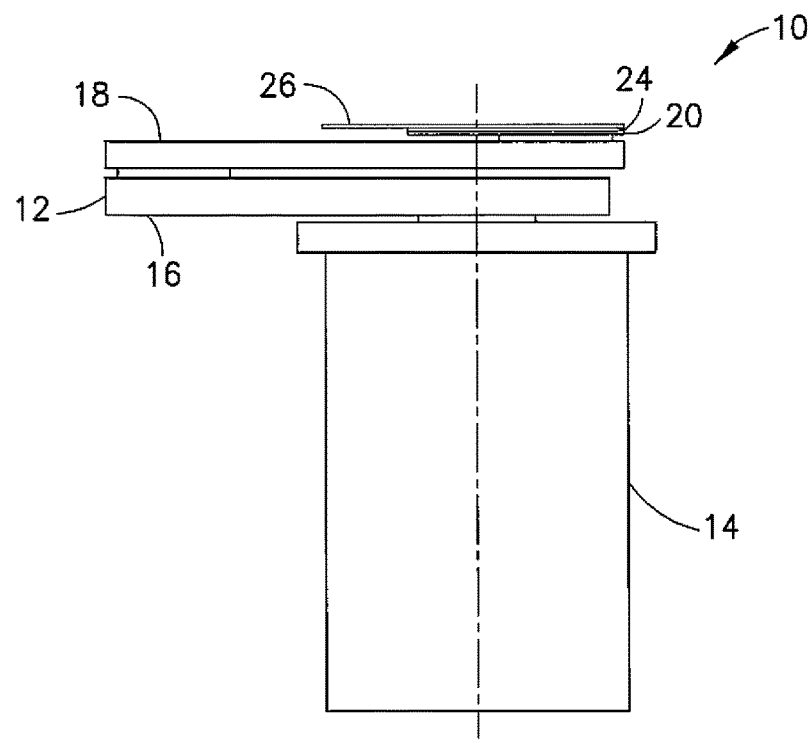
FIG. 2 is a side view of the example shown in FIG. 1.

FIG. 1 shows a top view and FIG. 2 shows a side view of the robot 10. The robot 10 comprises a robot arm 12, according to one example embodiment, shown installed on a robot drive unit 14. In this example embodiment the robot arm 12, which is shown in its retracted position, comprises a first link 16 (upper arm), a second link 18 (forearm) and a third link 20. The third link 20 includes an end-effector support structure 22, which may carry an end-effector 24. In one example embodiment the end-effector support structure 22, the end-effector 24 and the third link 20 may be integral.

The end-effector 24 is configured to hold a payload 26, such as a circular wafer substrate or flat panel substrate for example.

Figure 3:
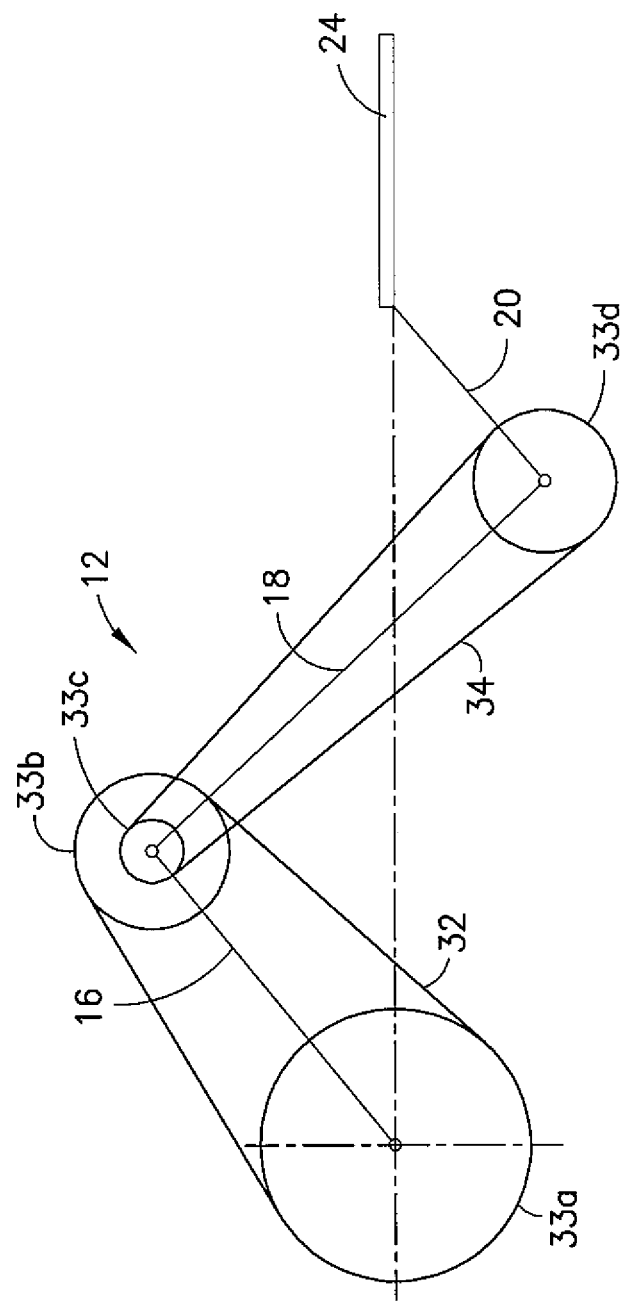
FIG. 3 is a diagram illustrating an example belt drive in the example shown in FIGS. 1-2.

An example internal arrangement of the robot 10 is depicted diagrammatically in FIGS. 3-4. In this example embodiment the robot arm 12 is driven by a two-axis spindle with two coaxial shafts, for example, an outer T1 shaft 28 and an inner T2 shaft 30. Each of the shafts may be actuated by the drive unit 14, for instance, using the motors 29, 31 or any suitable actuator. In an alternate example a different drive unit could be provided.

In the example of FIGS. 3-4, the upper arm 16 is connected to the T1 shaft 28. The forearm 18 is coupled via a band arrangement 32 to the T2 shaft 30. The band drive in this example, including the band arrangement 32 and pulleys 33a, 33b, 33c, 33d, is designed such that rotation of the upper arm 16 causes the wrist joint (at the joint of the $2^{nd}$ and $3^{rd}$ links 18, 20) to extend and retract along a straight line parallel to or coinciding with the desired radial path of the end-effector 24. The third link 20 with the end-effector 24 may be constrained by a band drive 34 so that the end-effector 24 points radially regardless of the position of the first two links 16, 18. Example band drive designs are provided in U.S. Pat. No. 9,149,936 which is hereby incorporated by reference in its entirety. However, in an alternate example embodiment, any suitable type of system to rotate or move the links relative to one another may be provided.

In the example embodiment shown, the entire robot arm 12 is able to rotate by having both drive shafts 28, 30 move in a same direction of rotation of the robot arm by a same amount. In order for the end-effector 24 to extend and retract radially along a straight-line path, the drive shaft 28 coupled to the upper arm may be moved according to inverse kinematic equations (such as explained in U.S. Pat. No. 9,149,936 for example) while the other drive shaft 32 is kept stationary. However, please note that this is merely an example.

FIGS. 5A-5C illustrate extension motion of the robot of FIGS. 1-4. FIG. 5A shows the top view of the robot with the arm 12 in its retracted position. FIG. 5B depicts the robot arm 12 partially extended with the forearm 18 aligned on top of the upper arm 16. FIG. 5C shows the robot arm 12 in an extended position (not necessarily full extension).

A typical pick operation may include rotation of the entire robot arm 12 towards the station that holds the wafer 26 to be picked up, extend motion into the station, upward vertical motion of the end-effector 24 to pick the wafer 26, and retract motion of the arm from the station. A wafer place operation may include rotation of the entire robot arm towards the station where the wafer should be placed, extend motion of the arm as illustrated by FIGS. 5A-5C into the station, downward vertical motion of the end-effector 24 to place the wafer 26 in the station, and retract motion of the arm from the station.

In order to limit vibration of the arm 12, for instance from oscillations when the end-effector picks or places a wafer, vibration caused by excitation from the drive shafts 28, 30 during motion, or vibration originating from external sources of excitation, it is advantageous for the robot arm to possess a high degree of energy dissipation capability. The energy dissipation capability may be conveniently enhanced by utilizing supplementary dampers according to features as describe herein.

The dampers 50 of the example of FIGS. 1-5 may be applied to one or more components of the robot arm 12 that may flex such as, for example, which exhibit elastic deformation when subject to vibration. Generally, the dampers 50 may include separate components configured to be in contact, either directly or through another damping element, with a flexing component of the robot arm 12 and dissipate energy utilizing one or more of the following mechanisms: microslip at the contact surfaces, cyclic plastic deformation of contacting asperities and cyclic viscoelastic deformation of a damping element.

Microslip refers to minute displacements of the asperities of one surface, for instance a metal component, relative to the mating surface. In this case, energy is dissipated as a result of the frictional forces and the relative displacements. Cyclic plastic deformation of contacting asperities relates to microscale topology of the contacting surfaces, for example of two metal components, wherein energy is dissipated due to hysteresis associated with the plastic deformation of the contacting asperities. Hysteresis is the dependence of the state of a system on its history.

Unlike the above two mechanisms, which rely solely on the contact area to dissipate energy, cyclic viscoelastic deformation of a damping element refers to deformation of an additional viscoelastic damping element, or a layer, between two surfaces that may move relative to each other during vibration; resulting in deformation of the volume of the damping element. In this case, energy is dissipated due to hysteresis associated with the deformation of the damping element.

Viscoelasticity is the property of materials that exhibit both viscous and elastic characteristics when undergoing deformation. Viscous materials, like honey for example, resist shear flow and strain linearly with time when a stress is applied. Elastic materials strain when stretched and quickly return to their original state once the stress is removed. Viscoelastic materials have elements of both of these properties and, as such, exhibit time-dependent strain. Whereas elasticity is usually the result of bond stretching along crystallographic planes in an ordered solid, viscosity is the result of the diffusion of atoms or molecules inside an amorphous material.

Some examples of viscoelastic materials include amorphous polymers, semicrystalline polymers, biopolymers, metals at very high temperatures, and bitumen materials. Cracking occurs when the strain is applied quickly and outside of the elastic limit. Ligaments and tendons are viscoelastic, so the extent of the potential damage to them depends both on the rate of the change of their length as well as on the force applied. A viscoelastic material has the following properties:

hysteresis is seen in the stress-strain curve
stress relaxation occurs: step constant strain causes decreasing stress
creep occurs: step constant stress causes increasing strain Specifically, viscoelasticity is a molecular rearrangement. When a stress is applied to a viscoelastic material such as a polymer, parts of the long polymer chain change positions. This movement or rearrangement is called creep. Polymers remain a solid material even when these parts of their chains are rearranging in order to accompany the stress, and as this occurs, it creates a back stress in the material. When the back stress is the same magnitude as the applied stress, the material no longer creeps. When the original stress is taken away, the accumulated back stresses will cause the polymer to return to its original form. The material creeps, which gives the prefix visco-, and the material fully recovers, which gives the suffix-elasticity.

As an example, the end-effector support structure 22 of the example robot arm of FIGS. 1-5 may be susceptible to vibration in bending due to such factors as its cantilevered configuration, challenging aspect ratio (narrow and long form), and slim profile (cross-section). In order to enhance the capability of the end-effector support structure 22 to dissipate energy, one or more supplementary damper arrangements having one or more of the dampers 50 may be incorporated into the structure 22, as illustrated schematically in FIG. 1.

Figure 6A:
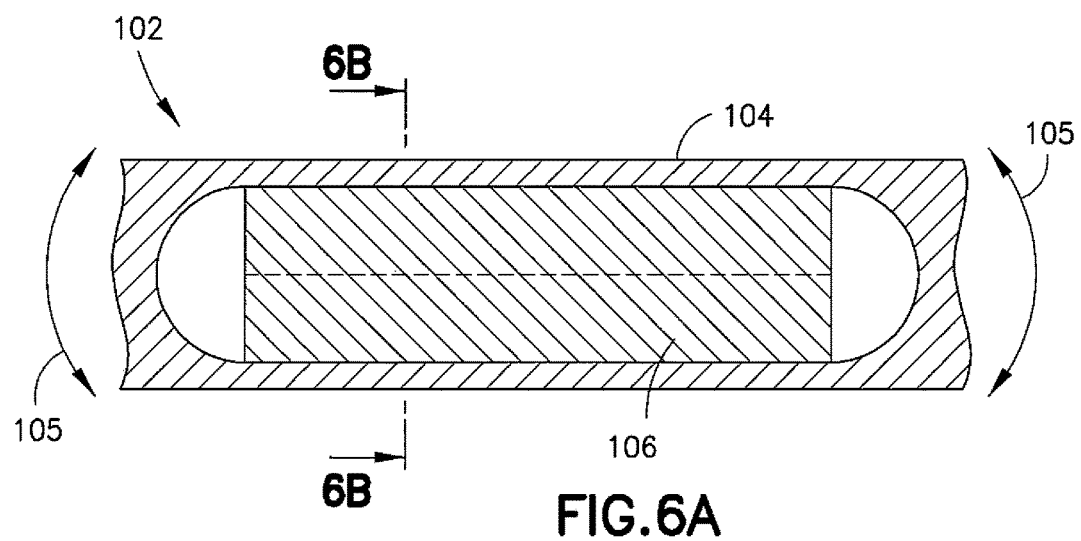
FIGS. 6A-6B are schematic cross sectional views of an example embodiment.
Figure 6B:
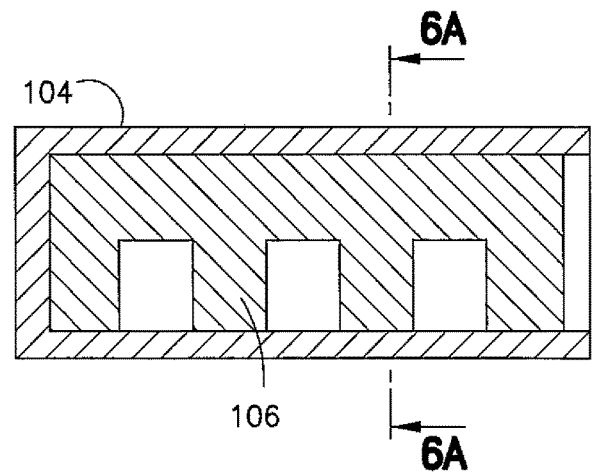

An example configuration of the damper 50 may have a supplementary damper arrangement 102 as depicted diagrammatically in FIGS. 6A-6B. FIGS. 6A-6B show the core structure or frame member 104 of the robot arm link 20, such as part of the end-effector support structure 22, and a damping component or element 106 inserted into the core structure 104. The element 106 may have an interference fit between the damping element 106 and the structure 104, such as selected to achieve energy dissipation due to microslip at the contact surfaces and cyclic plastic deformation of contacting asperities when the structure 104 oscillates, such as in bending for example.

Considering oscillations in bending, as illustrated by arrows 105 in FIGS. 6A-6B, the geometry of the damping element 106 may be conveniently selected so that the neutral plane of the damping element 106 does not coincide with the neutral plane of the core structure 104. This may increase relative interaction (such as displacement for example) between the surfaces of the core structure 104 that interact with the damping element 106.

Figure 7A:
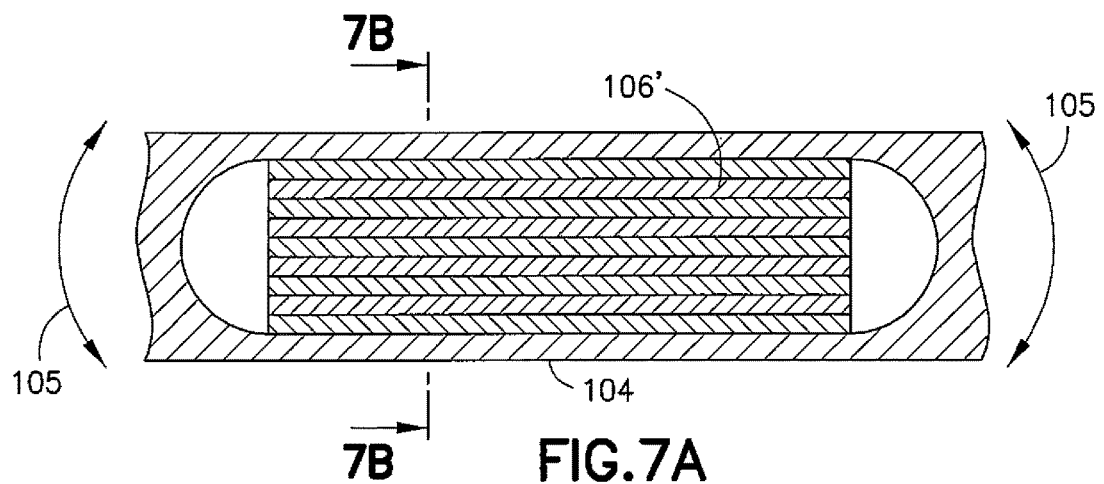
FIGS. 7A-7B are schematic cross sectional views similar to FIG. 6 of another example embodiment.
Figure 7B:
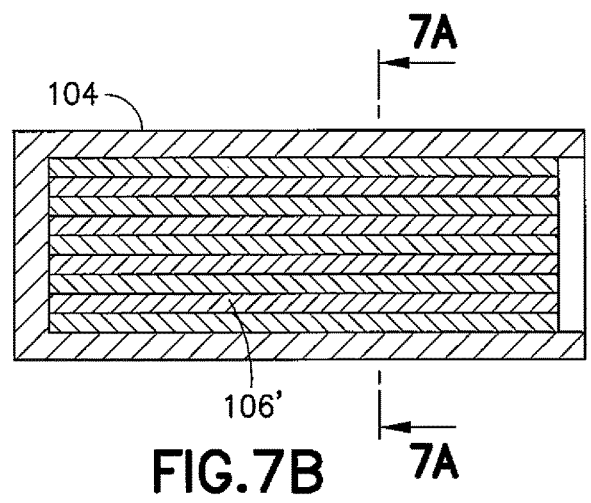

As depicted diagrammatically in the example of FIGS. 7A-7B, the damping element 106' may be segmented to provide additional contact surfaces for energy dissipation.

The damping elements 106, 106' in the examples of FIGS. 6-7 may be made of a same material as the structure 104 of the robot arm. Alternatively or additionally, different materials, such as aluminum and stainless steel for example, may be used for the structure 104 of the robot arm and the damping elements 106, 106'.

Figure 8A:
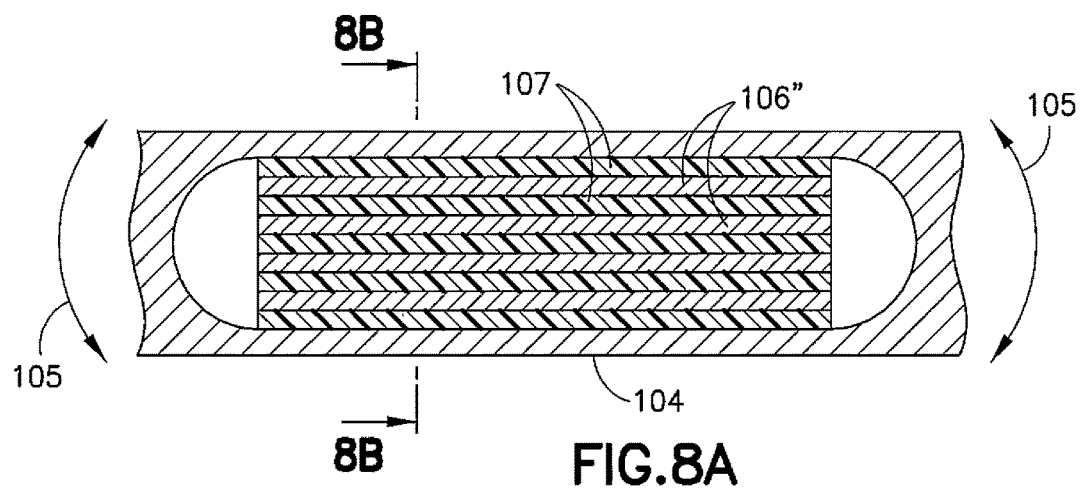
FIGS. 8A-8B are schematic cross sectional views similar to FIG. 6 of another example embodiment.
Figure 8B:
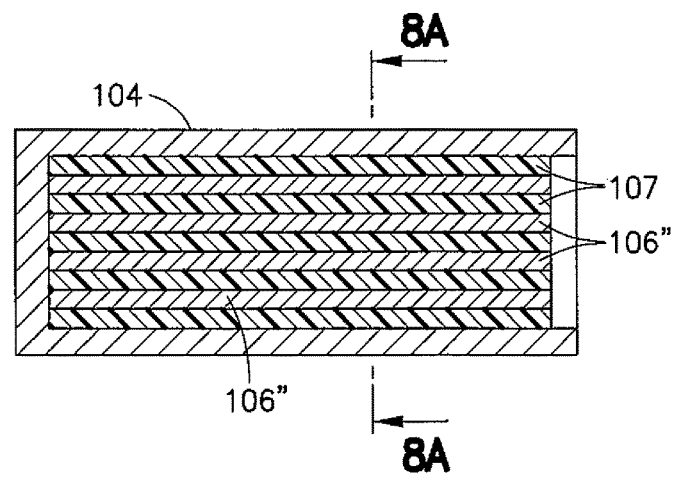

As another example, which is depicted diagrammatically in FIGS. 8A-8B, the segments of the damping 106" element may be coated or interleaved with layers 107 of viscoelastic material to further enhance energy dissipation by cyclic viscoelastic deformation of the viscoelastic material.

Example responses of a structure of a robot arm to an initial displacement is graphed in FIG. 9. The vertical and horizontal axes represent displacement 162 and time 164, respectively. The thin line 166 illustrates the response of the structure 104 without the damper arrangement, and the bold line 168 illustrates the response of the structure 104 with the damper arrangement 102.

Another example embodiment of the supplementary damper arrangement according to an example embodiment may include one or more components configured to allow for relative motion with respect to the core structure 104 of the robot arm and/or with respect to each other, and one or more viscoelastic elements configured to be deformed as a result of the aforementioned relative motion, as depicted diagrammatically in FIGS. 10-14.

Figure 10:
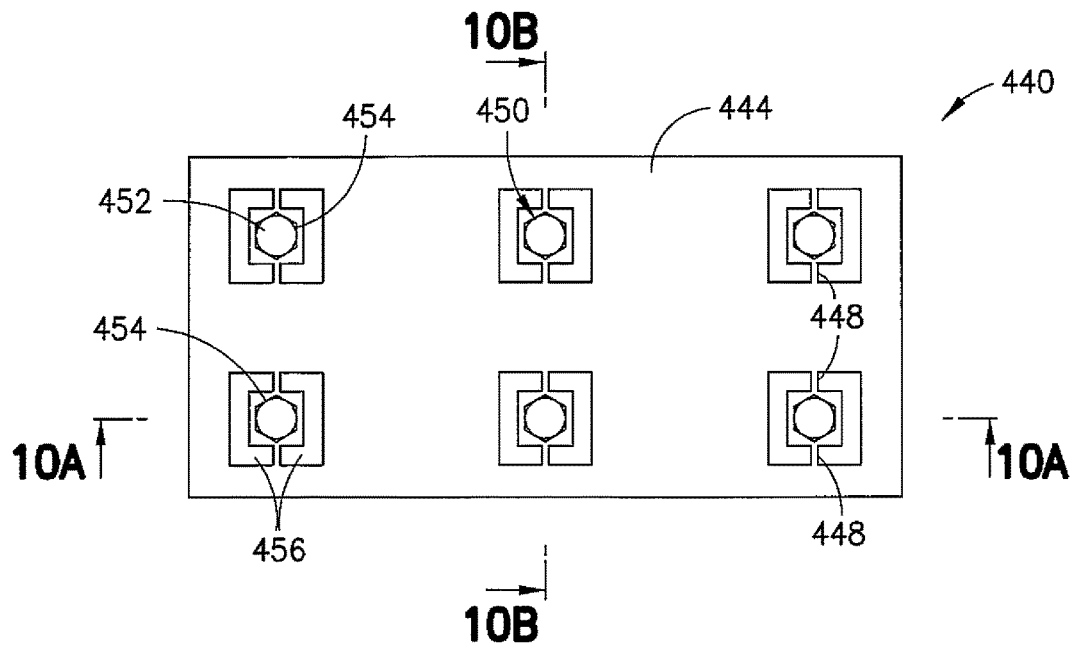
FIGS. 10, 10A and 10B are a top view and cross sectional views of an example embodiment.
Figure 10A:
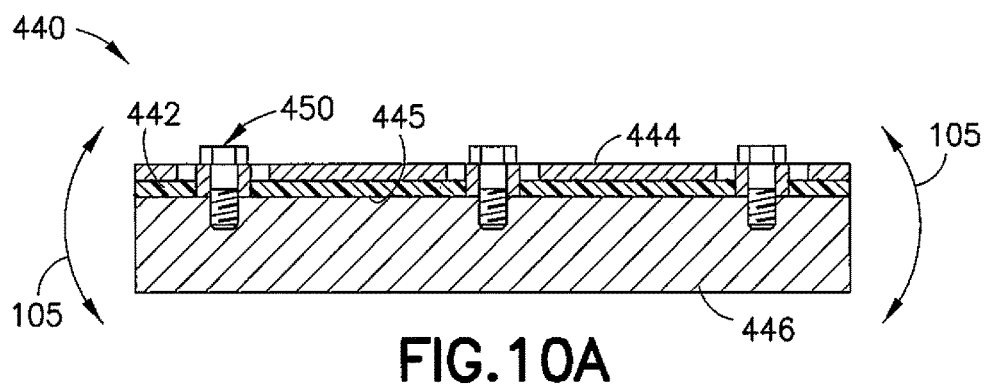
Figure 10B:
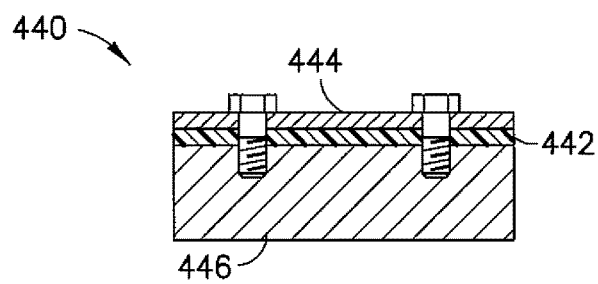

In the example 440 of FIGS. 10-10B, a single viscoelastic element 442 may be sandwiched between a clamping component 444 and a surface 445 of the core structure 446 of the robot arm. In this particular example, the clamping component 444 comprises flexures 448 to allow for relative motion of the clamping component 444 and the core structure 446 of the robot arm. Fasteners 450 are shown screwed into the core structure 446. A head 452 of each fastener 450 contacts a fastener contact area 454 of the clamping component 444 to press the fastener contact area 454 towards the surface 445 of the core structure 446. The clamping component 444 has slots 456 to form, the flexures 448 and fastener contact areas 454. The flexures 448 connect the fastener contact areas 454 to the rest of the clamping component 444.

Figure 11:
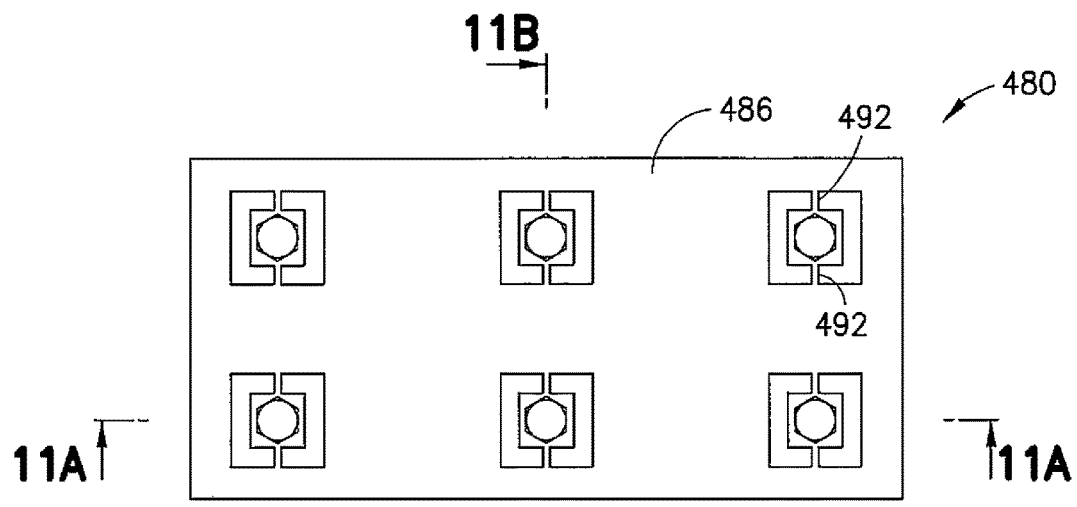
FIGS. 11, 11A and 11B are a top view and cross sectional views of another example embodiment.
Figure 11A:
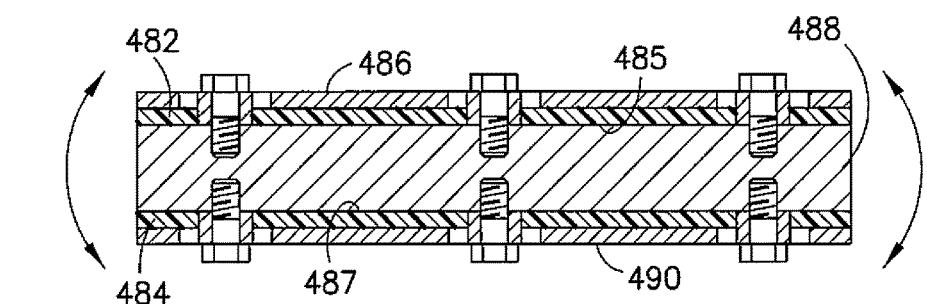
Figure 11B:
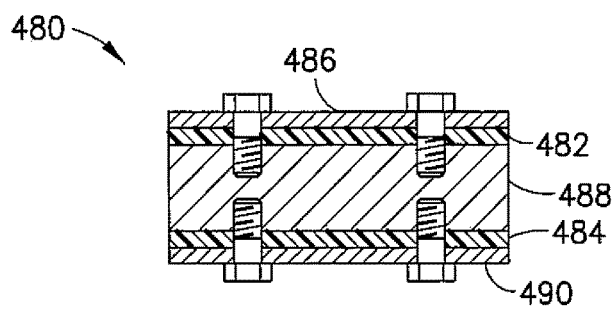

As another example, as depicted in FIGS. 11-11B, two viscoelastic elements 482, 484 may be utilized. One viscoelastic component 482 may be sandwiched between a top clamping component 486 and the top surface 485 of the core structure 488 of the robot arm, and another viscoelastic component 484 may be sandwiched between a bottom clamping component 490 and the bottom surface 487 of the core structure 488 of the robot arm. In this particular example, the clamping components may feature flexures 492 to allow for relative motion of the clamping components and the core structure of the robot arm.

Figure 12:
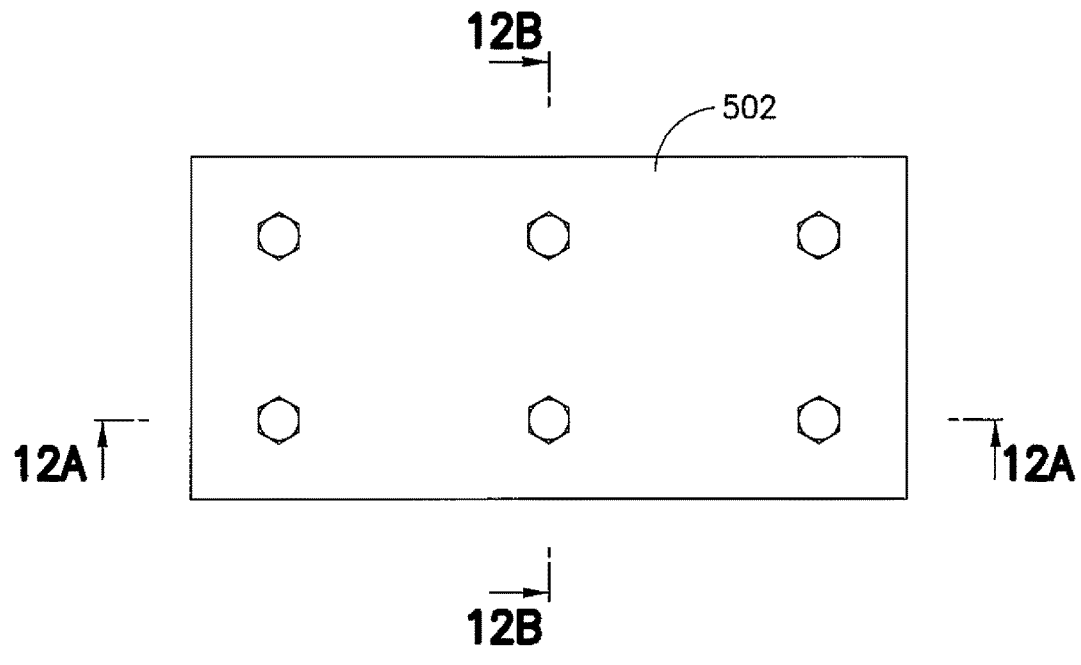
FIGS. 12, 12A and 12B are a top view and cross sectional views of another example embodiment.
Figure 12A:
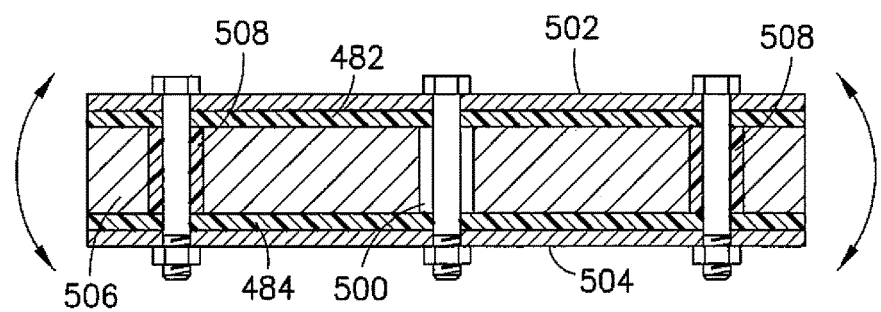
Figure 12B:
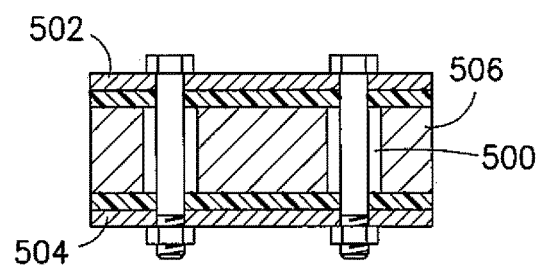

FIGS. 12-12B show another example in which clearance holes 500 through the core structure 506 of the robot arm link may be utilized to allow for relative motion of the top clamping component 502 and, the cores structure 506 of the robot arm as well as the bottom clamping component 504 and the core structure 506 of the robot arm. One or more of the clearance holes may feature viscoelastic sleeves 508 in order to maintain the clamping components and the clamping hardware close to the nominal location with respect to the core structure of the robot arm.

Figure 13:
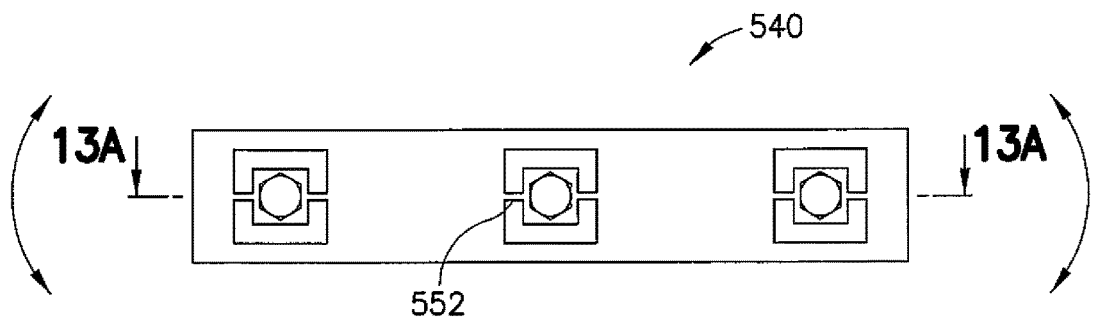
FIGS. 13, 13A and 13B are a top view and cross sectional views of another example embodiment.
Figure 13A:
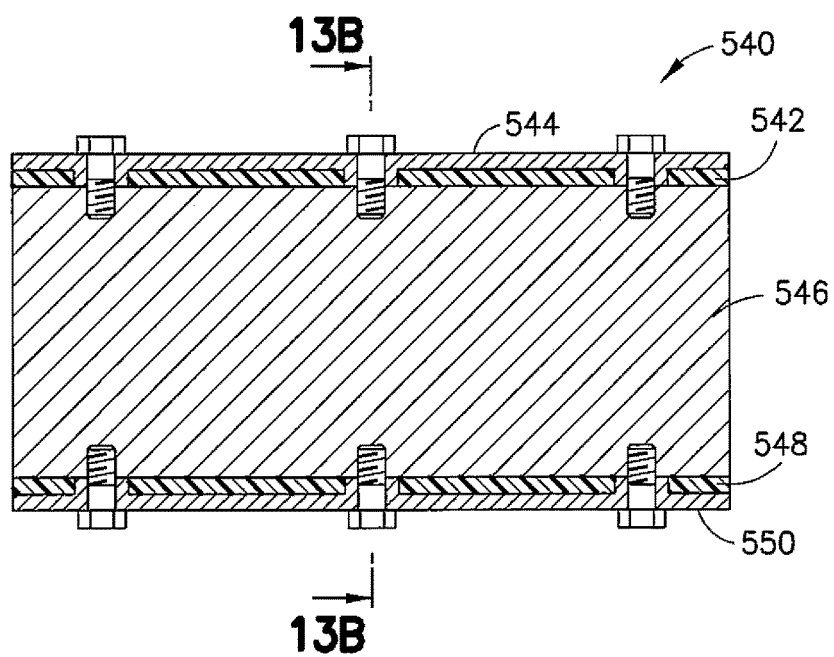
Figure 13B:
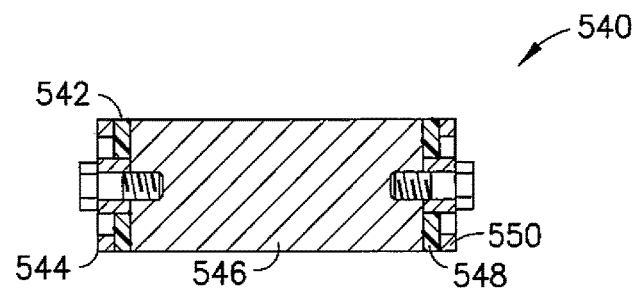

Another example configuration 540 of the supplementary damper arrangement with two viscoelastic elements is depicted diagrammatically in FIGS. 13-13B. In this example, one viscoelastic component 542 may be sandwiched between a left clamping component 544 and the left surface of the core structure 546 of the robot arm, and another viscoelastic component 548 may be sandwiched between a right clamping component 550 and the right surface of the core structure 516 of the robot arm. In this particular example, the clamping components may feature flexures 552 to allow for relative motion of the clamping components and the core structure of the robot arm.

Figure 14:
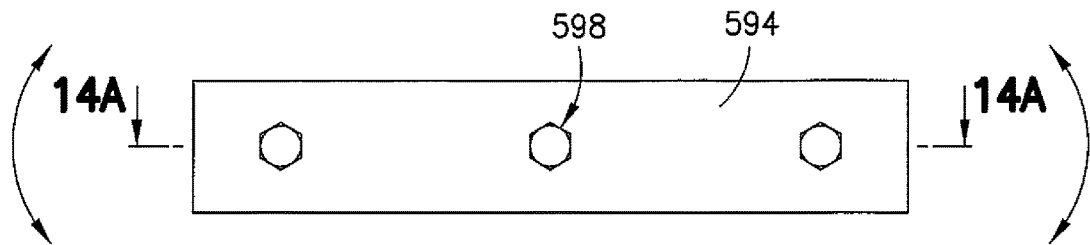
FIGS. 14, 14A and 14B are a top view and cross sectional views of another example embodiment.
Figure 14A:
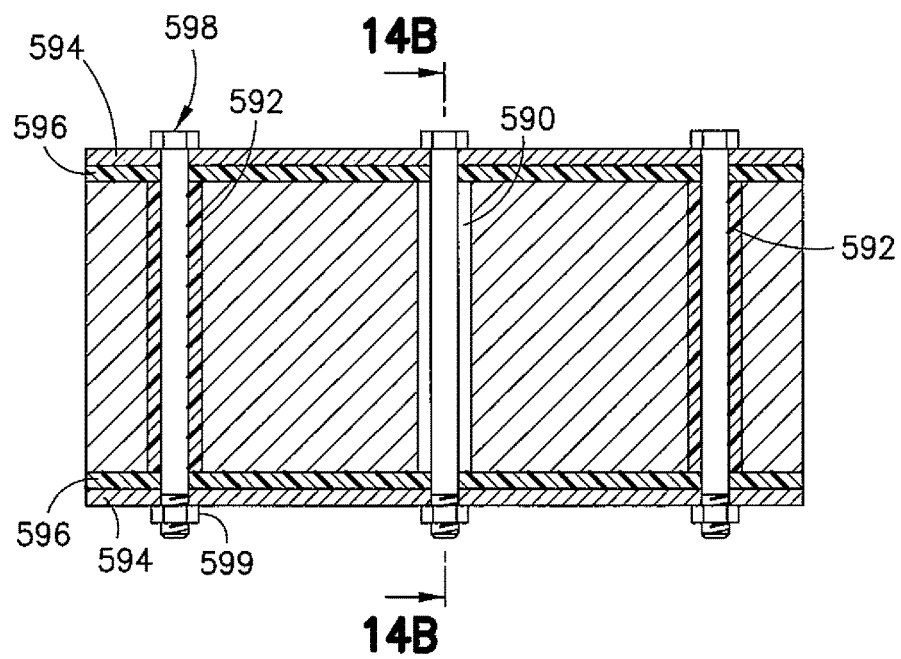
Figure 14B:
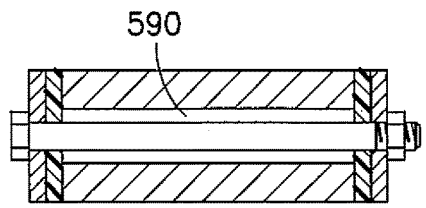

Another example embodiment is shown, diagrammatically, in FIGS. 14-14B, clearance holes 590 through the core structure of the robot may be utilized to allow for relative motion of the left clamping component and the core structure of the robot arm as well as the right clamping component and the core structure of the robot arm. The clearance holes may feature viscoelastic sleeves 592 in order to maintain the clamping components and the clamping hardware close to the nominal location with respect to the core structure of the robot arm. In this example there are clamping components 594 which do not have flexures, viscoelastic elements 596, and long fasteners comprising bolts 598 and nuts 599.

Another example configuration of the supplementary damper arrangement may include one or more components or elements embedded partially or completely into the core material of the structure. For example, as depicted diagrammatically in FIGS. 15-153, spherical elements 220 may be embedded into the core material 224 of the structure 104. As another example, as illustrated diagrammatically in FIGS. 16-163, the spherical elements 220' may be hollow to reduce weight. As yet another example, which is shown diagrammatically in FIGS. 17-17A, cylindrical components or fibers 232 may be embedded into the core material 233 of the structure 104.

Although FIGS. 10-17 show cross sectionally spherical and cylindrical elements, any suitable shapes and sizes and their combinations may be used. The elements 220, 220', 232 may be tightly packed, such as in the examples of FIGS. 15-17, or they may be loosely dispersed in the structure.

The viscoelastic elements, such as 220, 220' and 232 for example, may be embedded partially or completely into the core material of the structure and may be, for example, ceramic, such as silicon carbide or aluminum oxide. The core material of the structure may be, for example, an aluminum alloy, resulting in a desirable combination of high stiffness, low weight and enhanced energy dissipation capability. Alternatively, any suitable combination of materials may be used.

Figure 16B:
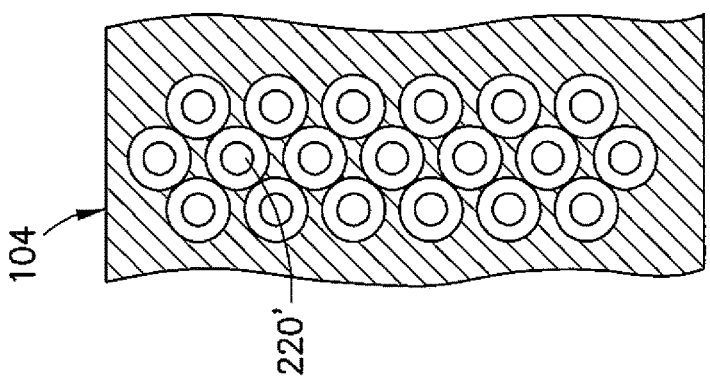
FIGS. 16, 16A and 16B are cross sectional views of another example embodiment.
Figure 16A:
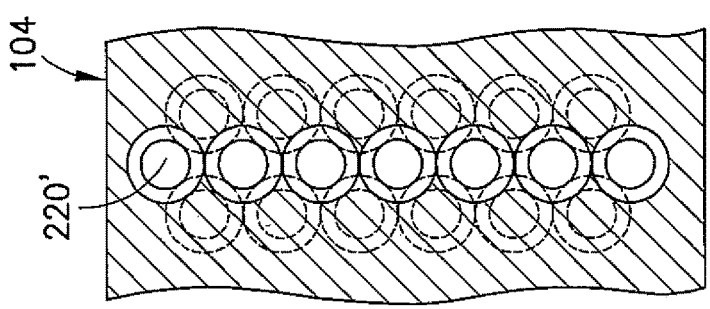
Figure 16:
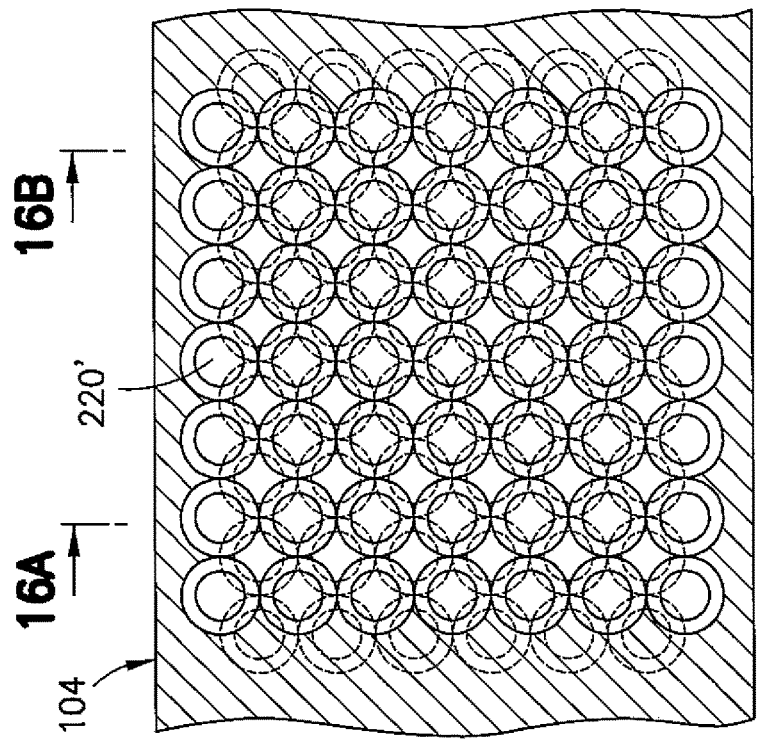
Figure 17:
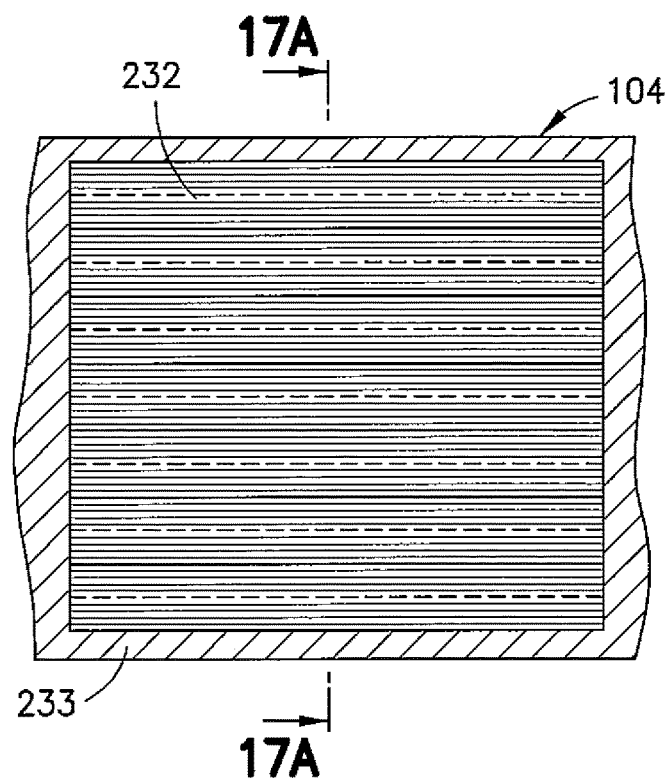
FIGS. 17 and 17A are cross sectional views of another example embodiment.
Figure 17A:
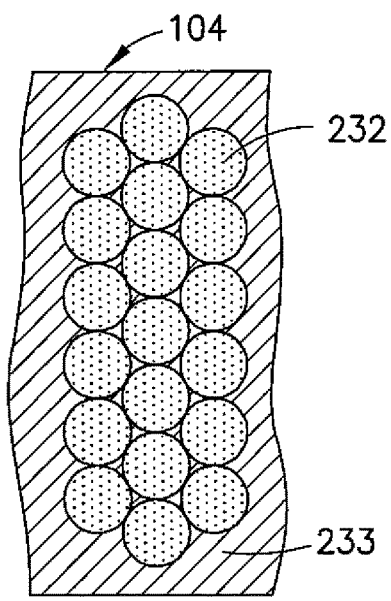

The supplementary damper arrangement with one or more viscoelastic elements embedded partially or completely into the core material of the structure, as exemplified by FIGS. 15-17, may be produced, for example, by a single- or multi-step casting process where the elements are suspended inside the cast core material. As another example, a deposition process, such as a plasma spray process, a high velocity oxygen fuel process, a high velocity air fuel process, a cold spray process or a combination of such deposition processes, may be used to deposit the core material and/or the elements embedded into the core material. As yet another example, 3D printing process may be utilized.

It should be noted that the arrangements of FIGS. 6-8 and 10-17 are configured not to compromise stiffness and minimize hysteresis. Since the arrangements of FIGS. 6-8 and 10-17 do not employ macroslip (particle generation), fluids (challenging to seal) or adhesives (outgassing), which are often found in dampers, the arrangements exemplified in the drawings are suitable for applications in clean and vacuum environments.

Figure 18:
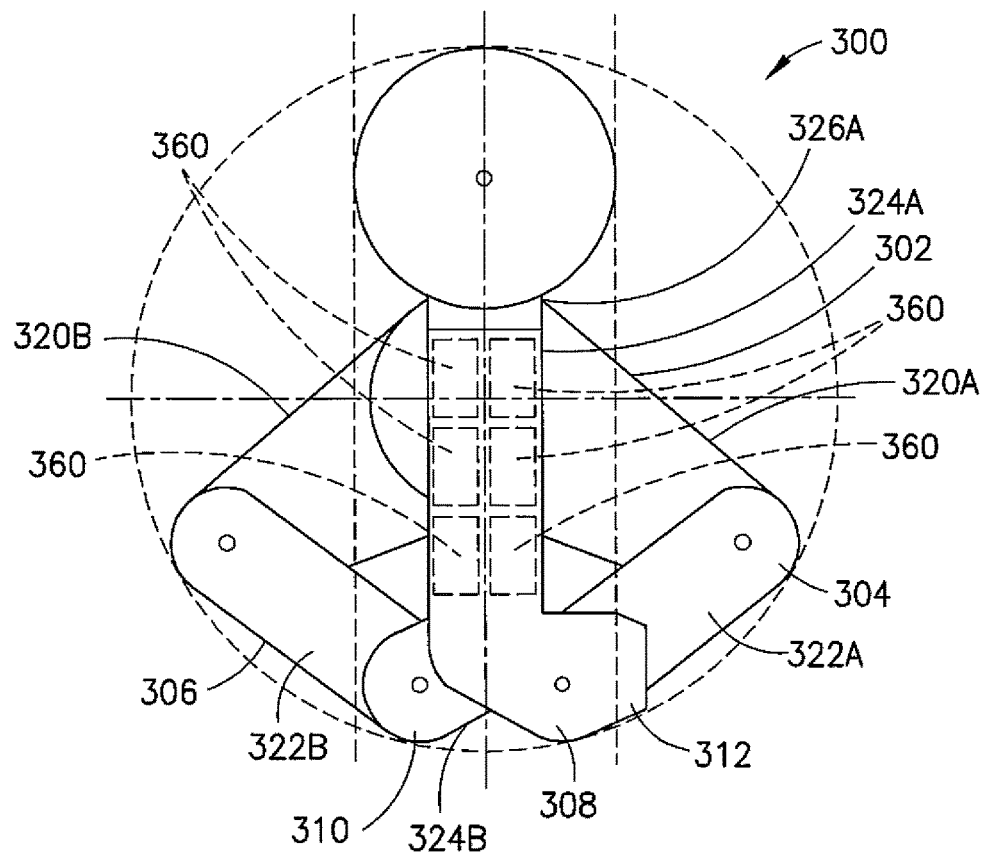
FIG. 18 is a schematic top view of another example embodiment.
Figure 19:
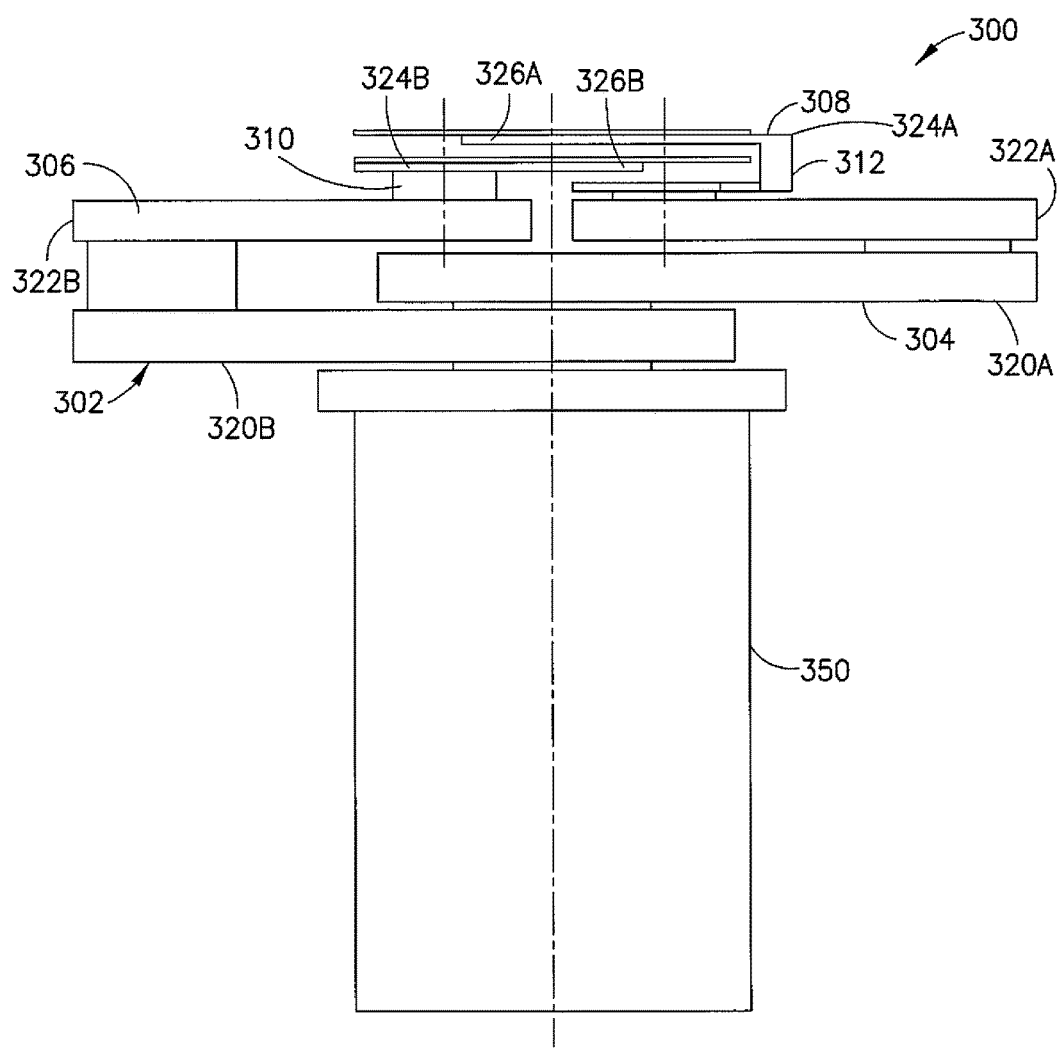
FIG. 19 is a side view of the embodiment shown in FIG. 18.

FIGS. 18-19 show the top and side views of a robot 300 with an example robot arm 302 according to another example embodiment which is shown installed on a robot drive unit 350. The robot arm 302 may include two linkages; a right linkage 304 and a left linkage 306. Both linkages 304, 306 are shown in their retracted positions in FIGS. 18-19. Right linkage 304 may comprise of a first link (upper arm) 320A, a second link (forearm) 322A, and a third link 324A. The third link 324A may include an end-effector support structure, which may carry an end-effector 326A configured to hold a payload, such as a circular semiconductor wafer for example. Similarly, left linkage 306 may consist of a first link (upper arm) 320B, second link (forearm) 322B, and a third link 324B. The third link 324B may include an end-effector support structure, which may carry an end-effector 326B also configured to hold a payload, such as a circular wafer.

As illustrated in FIGS. 18-19, the end-effector support structure of right linkage 304 may be designed to elevate end-effector 326A above end-effector 326B and feature a U-shaped bridging section 312 to prevent interference with end-effector 326B and its payload during extend and retract moves.

Figure 20:
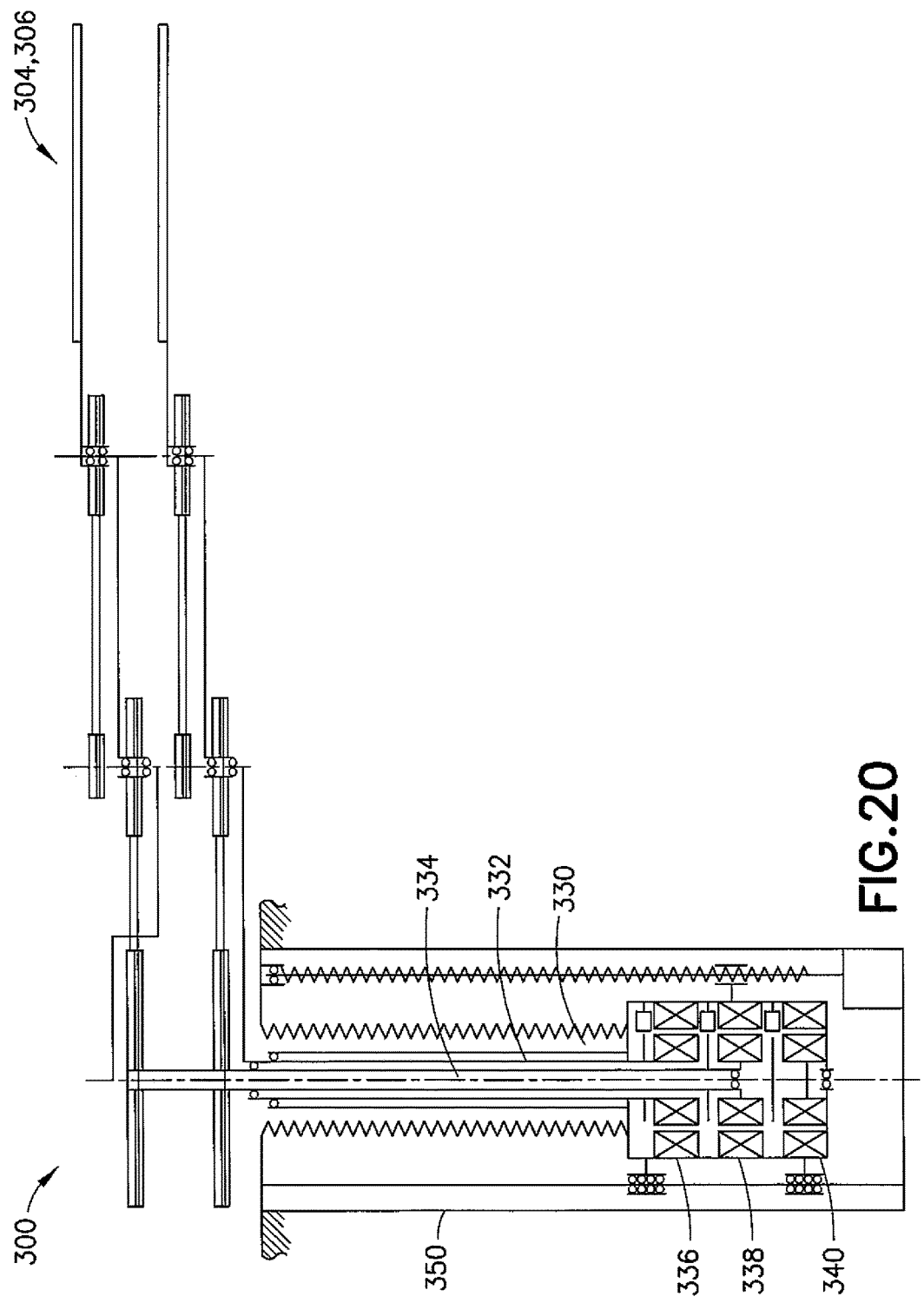
FIG. 20 is a schematic cross sectional view of the example shown in FIGS. 18-19.

FIG. 20 depicts the internal arrangements that may be used to drive the individual links of the robot arm of FIGS. 18-19 (for graphical clarity, to avoid overlap of components, the elevations of the links and end-effectors are adjusted and do not correspond directly to FIGS. 18-19). As illustrated in FIG. 20, the robot arm may be driven by a three-axis spindle with three coaxial shafts, for example, an outer T1 shaft 330, a T2 shaft 332 and an inner T3 shaft 334. Each of the shafts may be actuated by the drive unit, for instance, using a motor or any suitable actuator 336, 338, 340 respectfully.

Still referring to FIG. 20, each of the two upper arms 320A, 320B may be driven independently by a motor-actuated shaft, for instance, by the T1 and T3 shafts 330, 334. The forearms 322A, 322B may be coupled via band arrangements to a third shaft, for example, the T2 shaft 332. The band drives may be conveniently designed so that rotation of one of the upper arms causes the corresponding linkage to extend and retract its end-effector along a substantially straight line while the other linkage remains stationary such as described in U.S. Pat. No. 9,149,936 for example. Each of the third links 326A, 326B may be constrained by another band drive arrangement so that the end-effector points in the radial direction, such as described in U.S. Pat. No. 9,149,936 for example.

In order for the robot arm to rotate, all three drive shafts of the drive unit may need to move in sync in the direction of rotation of the robot arm by the same amount. In order for one of the end-effectors to extend and retract radially along a straight-line path, the drive shaft of the upper arm associated with the corresponding end-effector may be rotated according to the inverse kinematic equations such as described in U.S. Pat. No. 9,149,936 for example, and the other two drive shafts may be kept stationary.

Figure 21:
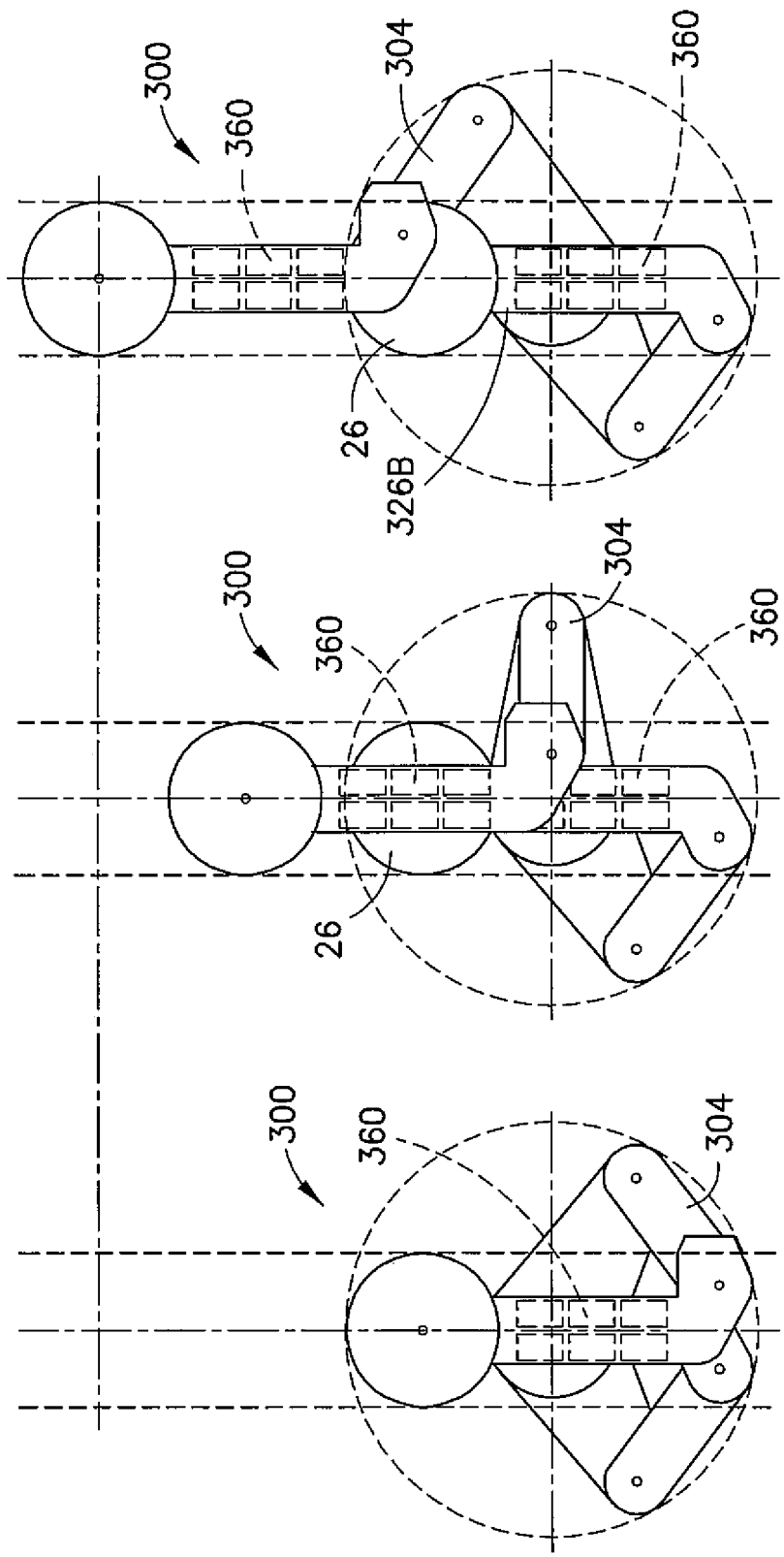
FIGS. 21A-21C are schematic top views of the example shown in FIGS. 18-20 showing movement of one of the arm sections.

FIGS. 21A-21O show examples of the robot arm of FIGS. 18-20 as linkage 304 extends. Note that the end-effector support structure provides space for end-effector 326B and its payload 26 in order to prevent interference during extend and retract moves, which explains its U-shaped bridging section.

Similarly to the example of FIGS. 1-2, the end-effector support structures of the example robot arm of FIGS. 21A-21C may be susceptible to vibration due to their cantilevered configuration, challenging aspect ratio (narrow and long form), slim profile (cross-section) and, in case of linkage 304, the U-shaped bridging section 312, the cross-section of which may often be compromised by the available space.

In order to enhance the capability of the end-effector support structures to dissipate energy, one or more supplementary damper arrangement 360, such as the example of FIGS. 6-8 and 10-17, may be incorporated into each of the structures 304, 306, as illustrated schematically in FIGS. 18-20. In an example embodiment, the supplementary damper arrangements may be applied in locations where the relative displacements between the contact surfaces or the surfaces that interact with the damping elements can be maximized.

Figure 22:
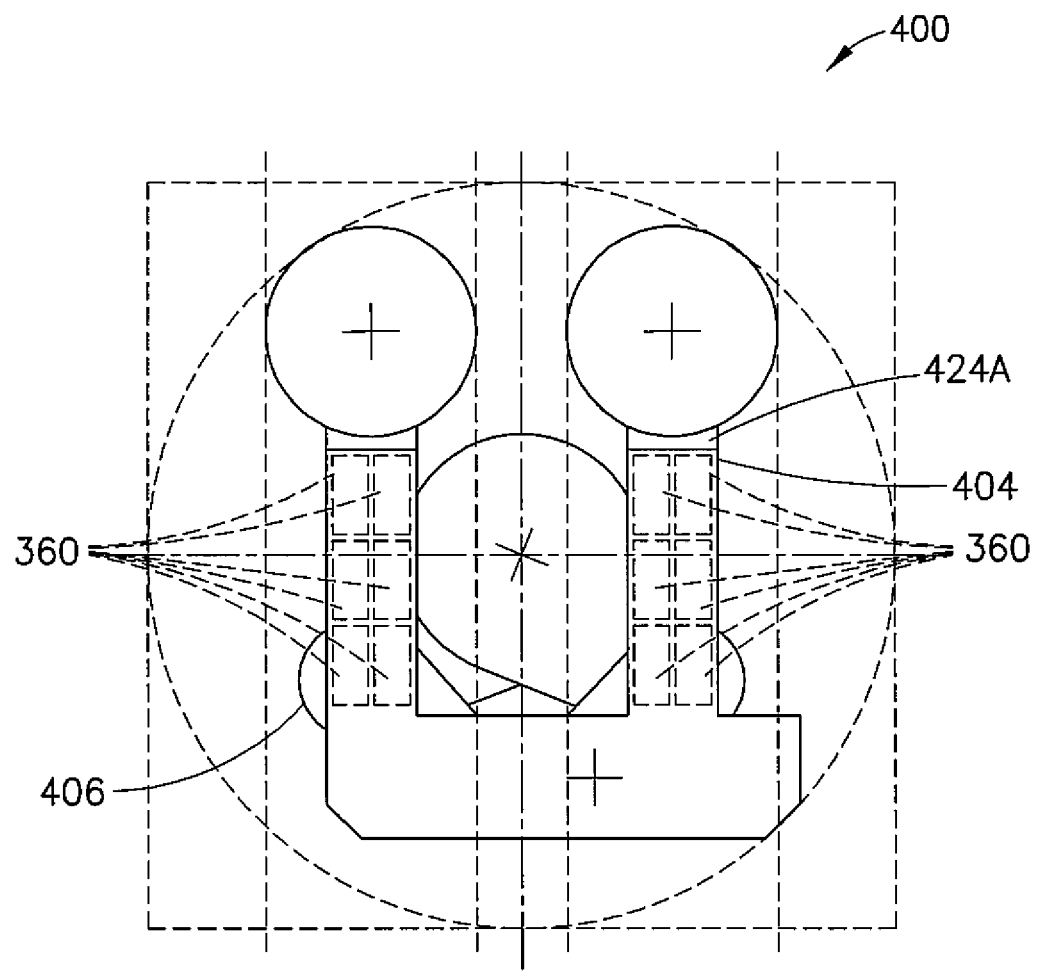
FIG. 22 is a schematic top view of another example embodiment.
Figure 23:
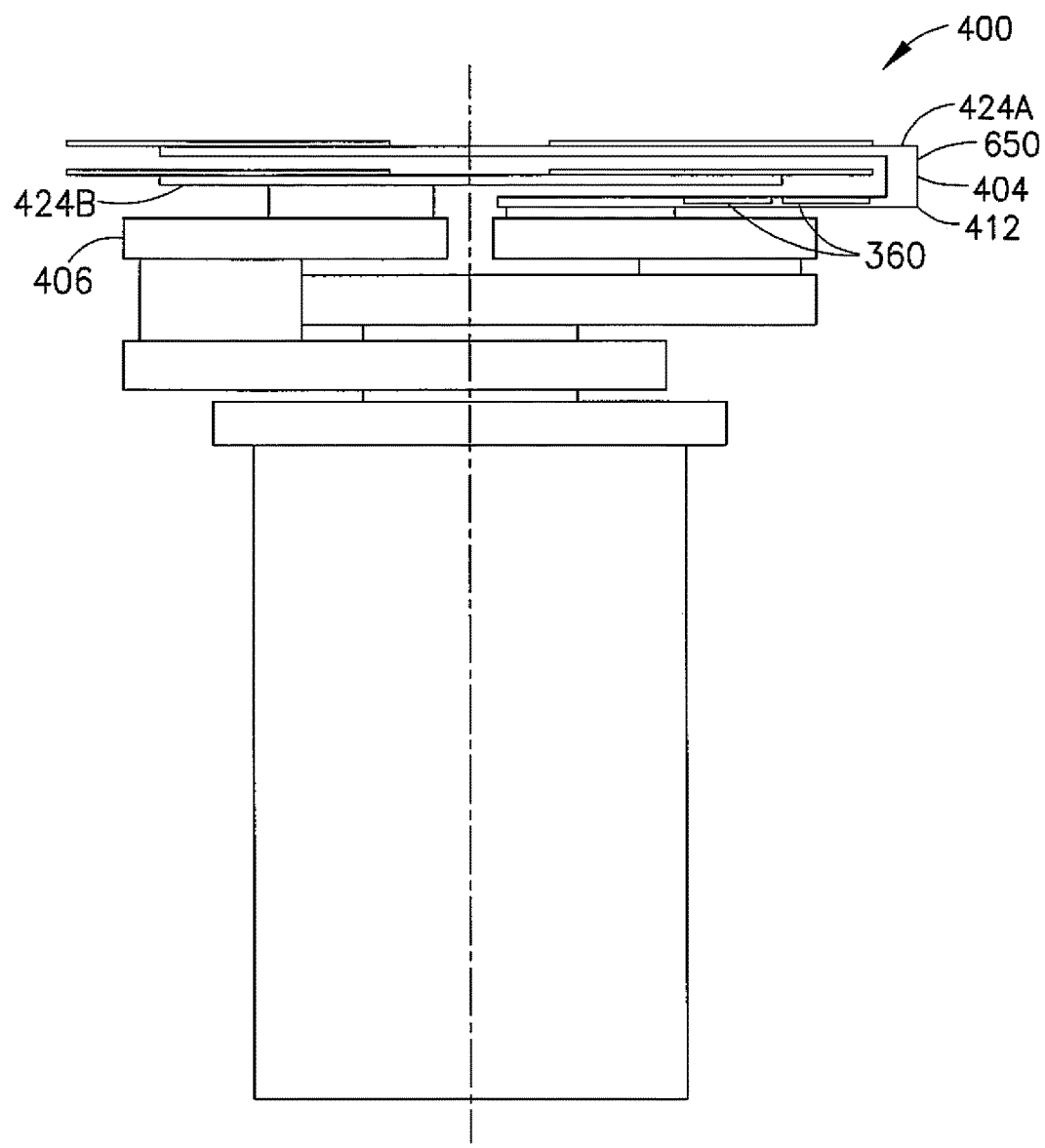
FIG. 23 is a side view of the embodiment shown in FIG. 22.

FIGS. 22-23 show the top and side views of a robot 400 with an example robot arm according to yet another example embodiment installed on a robot drive unit. The arm is conceptually similar to the example of FIGS. 18-20 except the each of the two linkages of the robot arm features a pair of end-effectors.

As illustrated in FIGS. 22-23, the end-effector support structure of right linkage 404 may be designed, similarly to the example of FIGS. 18-20, to elevate end-effector pair 424A above end-effector pair 424B and feature a U-shaped bridging section 412 to prevent interference with the right-hand-side end-effector of linkage 406 and its payload during extend and retract moves. This is illustrated in FIG. 24, which shows the robot arm of FIGS. 22-23 with linkage 404 extended.

Figure 24:
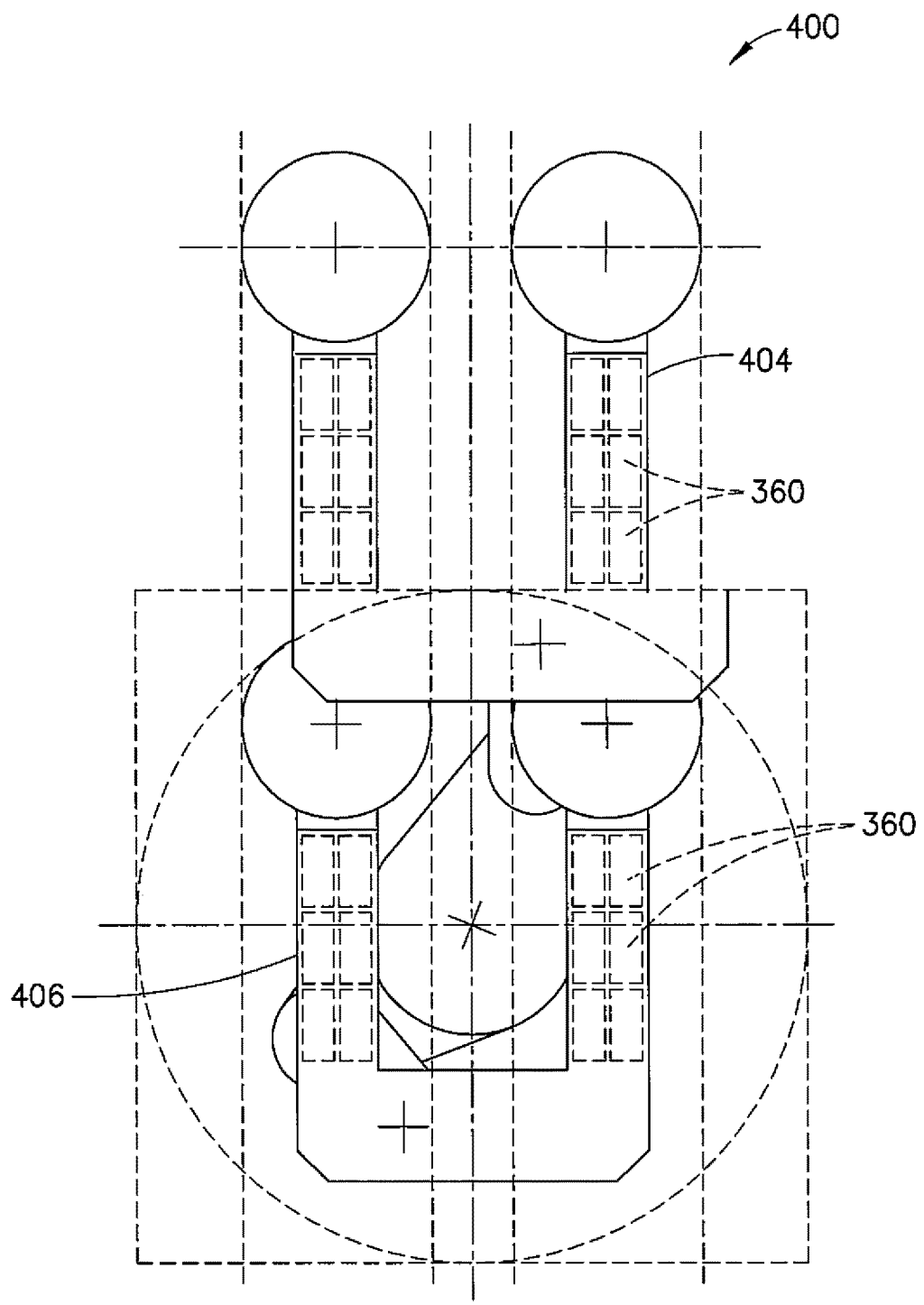
FIG. 24 is a schematic top view of the example shown in FIGS. 22-23 showing movement of one of the arm sections.

In order to enhance the capability of the end-effector support structures to dissipate energy, one or more supplementary damper arrangement 360, such as the example of FIGS. 6-8 and 10-17, may be incorporated into each of the structures, as illustrated schematically in FIGS. 22-24. Again, the supplementary damper arrangements 360 may be conveniently applied in locations where the relative displacements between the contact surfaces or the surfaces that interact with the damping elements can be maximized.

Considering that various vibration modes may produce relative displacement between the upper horizontal portion and the lower horizontal portion of the U-shaped bridging section 412 of the end-effector support structure described above with respect to FIGS. 22-24, a U-shaped supplementary arrangement 650 may be applied.

Figure 25:
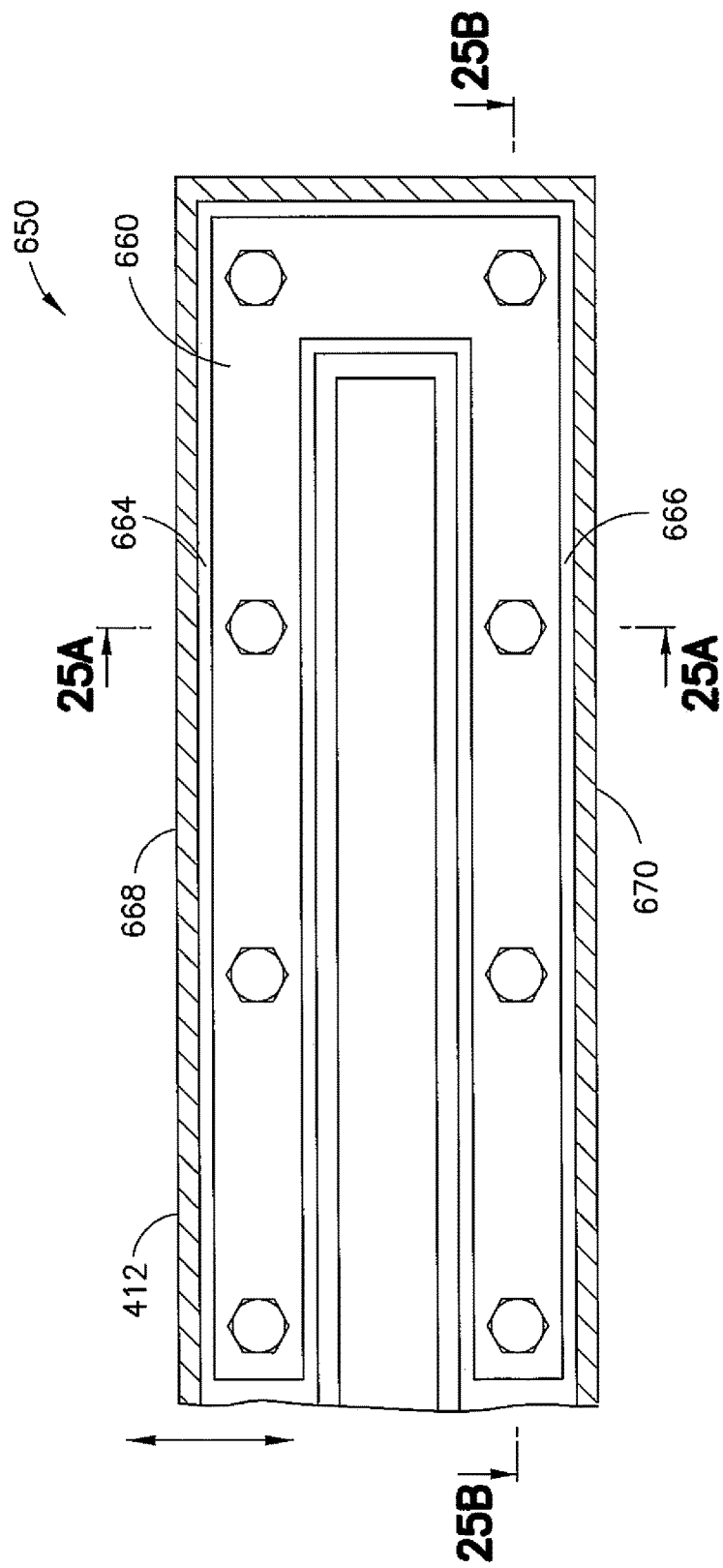
FIGS. 25, 25A, 25B are cross sectional views of the bridging section shown in FIG. 23.
Figure 25A:
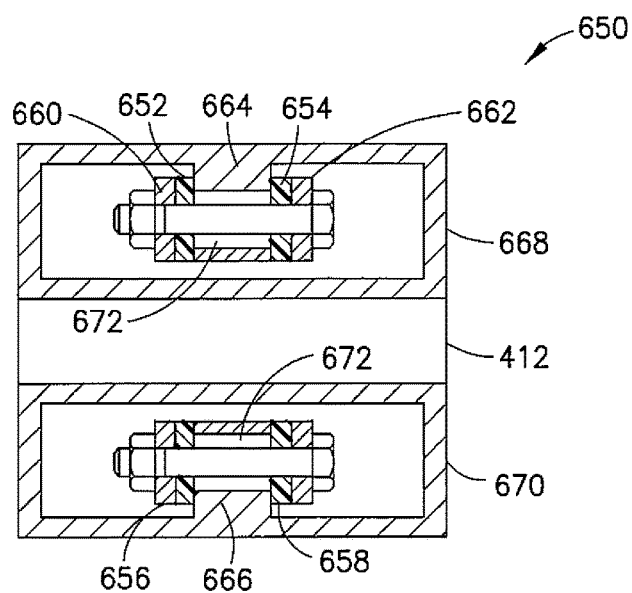
Figure 25B:
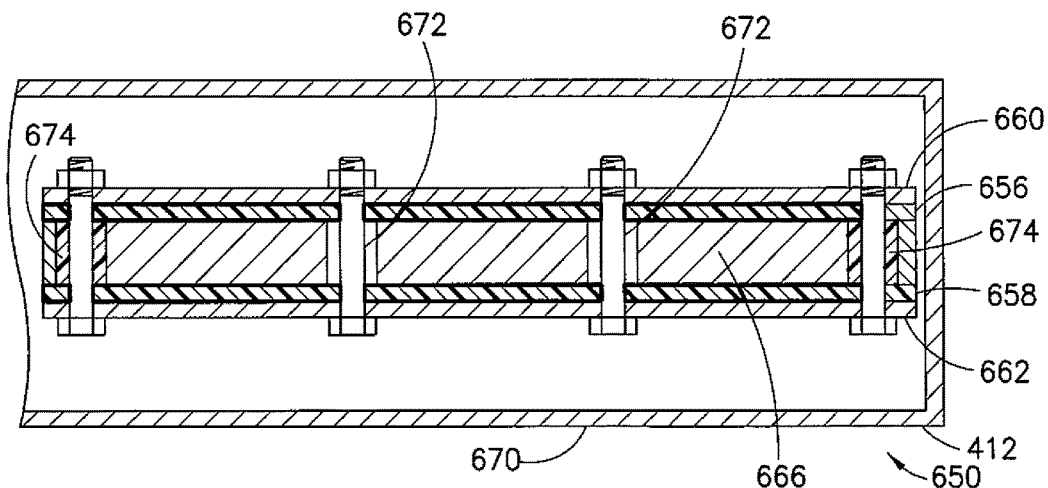

In the example of FIGS. 25, 25A, 25B, four viscoelastic elements 652, 654, 656, 658 two U-shaped clamping components 660, 662 may be utilized. A first viscoelastic component 652 may be sandwiched between the upper portion of a first U-shaped clamping component 660 and a surface of a rib 664 featured in the upper horizontal portion of the bridging section 668 of the end-effector support structure. A second viscoelastic component 654 may be sandwiched between the upper portion of a second U-shaped clamping component 662 and the opposite surface of the rib 664 featured in the upper horizontal portion of the bridging section 668 of the end-effector support structure. Similarly, a third viscoelastic component 656 may be sandwiched between the lower portion of the first U-shaped clamping component 660 and a surface of a rib 666 featured in the lower horizontal portion of the bridging section 670 of the end-effector support structure; and a fourth viscoelastic component 658 may be sandwiched between the lower portion of the second U-shaped clamping component 662 and the opposite surface of the rib 666 featured in the lower horizontal portion 670 of the bridging section of the end-effector support structure.

As shown diagrammatically in the example of FIGS. 25, 25A and 25B, clearance holes 672 through the ribs of the end-effector support structure may be utilized to allow for relative motion of the clamping components and the end-effector support structure. The clearance holes may feature viscoelastic sleeves 674 in order to maintain the clamping components and the clamping hardware close to the nominal location with respect to the end-effector support structure. Alternatively, any suitable arrangement that clamps the viscoelastic elements and allows for relative motion between the clamping components and the end-effector support structure may be used.

Although the example supplementary damper arrangements are described with respect to the example robot arms of the figures, they can be applied to any other suitable robot arm mechanisms, configurations and designs. Furthermore, the use of the example supplementary damping arrangements is by no means limited to end-effector and bridge support structures; they can be employed by or incorporated into to any other structural or auxiliary components of a robot arm that may exhibit vibration or be susceptible to it.

In addition, the example supplementary damping arrangements may be used elsewhere in a robot. For instance, considering the example robot architecture of FIGS. 3-4 and 20, the supplementary damping arrangement(s) may be incorporated into the frame of the robot drive unit, into the support of the robot arm and/or into the shafts driving the robot arm, in which examples the supplementary damping arrangement(s) may be configured to dampen oscillations such as, for example, in bending, in torsion, a combination of bending and torsion, or any other modes of natural or forced vibration.

Generally, the supplementary damper arrangements may be conveniently applied in locations where the relative interaction (i.e., displacement) between the contact surfaces of the damping elements or the surfaces of the core structure that interact with the damping elements can be maximized.

An example embodiment may be provided in an apparatus comprising a plurality of robot arm links movably connected to one another, where a first one of the robot arm links comprises a frame, where the frame has a first end movably connected onto a second one of the robot arm links; and at least one vibration damper arrangement on the frame of the first robot arm link, where the at least one vibration damper arrangement comprises at least one viscoelastic element connected to the frame of the first robot arm link by a connection such that, as the frame of the first robot arm link experiences vibrations, the at least one viscoelastic element dampens the vibrations in the frame of the first robot arm link based upon viscoelasticity and the connection of the at least one viscoelastic element to the frame of the first robot arm link.

The connection may comprise at least one fastener which clamps the at least one viscoelastic element onto a portion of the frame of the first robot arm link. The at least one viscoelastic element may comprise at least two of the viscoelastic elements which are clamped onto opposite sides of the portion of the frame of the first robot arm link. The connection may comprise plates which sandwich the at least two viscoelastic elements against opposite sides of the portion of the frame of the first robot arm link. The portion of the frame of the first robot arm link may have apertures for the fasteners to extend through. The apparatus may further comprise at least one viscoelastic sleeve located in at least one of the apertures between the frame of the first robot arm link and the fastener. The plates may comprise a general U-shaped section. The portion may extend in an inward direction inside the frame of the first robot arm link. The connection may further comprise at least one plate which is compressed against the at least one viscoelastic element by the at least one fastener such that the at least one plate presses the at least one viscoelastic element against a portion of the frame of the first robot arm link. The at least one viscoelastic element may comprise a first plate-shaped member comprised of viscoelastic material and at least one second sleeve-shaped member comprised of viscoelastic material, where the at least one second sleeve shaped member is located around at least one of the at least one fastener. The connection may further comprise at least one plate which is compressed against the at least one viscoelastic element to press the at least one viscoelastic element against a portion of the frame of the first robot arm link, where the at least one plate comprises a first plate comprising a fastener contact area connected to a rest of the first plate by at least one bendable flexure portion of the first plate. The at least one viscoelastic element may comprise a first plate-shaped member comprised of viscoelastic material and a second plate-shaped member comprised of viscoelastic material which are located on opposite sides of a portion of the frame of the first robot arm link. The connection may comprise a plate which sandwiches the at least one viscoelastic element against a flat surface of a portion of the frame of the first robot arm link. The at least one viscoelastic element may have apertures, and the connection comprises fasteners which extend through the apertures into a portion of the frame of the first robot arm link. The plurality of robot arm links may be rotatably connected to one another in series to form a robot arm, where the robot arm further comprises at least one end effector at a first end of the robot arm, and where the apparatus further comprises a drive connected to a second end of the robot arm, where the drive comprises coaxial drive shafts. The robot arm may further comprise belts and pulleys to rotate at least one of the robot arm links and/or the at least one end effector.

With features as described herein, an example embodiment and method may comprise attaching at least one vibration damper arrangement to a frame of a first robot arm link, where the at least one vibration damper arrangement comprises at least one viscoelastic element connected to the frame of the first robot arm link by a connection such that, as the frame of the first robot arm link experiences vibrations, the at least one viscoelastic element dampens the vibrations in the frame based upon viscoelasticity and the connection of the at least one viscoelastic element to the frame of the first robot arm link; and connecting a first end of the frame of the first robot arm link to a second robot arm link such that the frame of the first robot arm link is configured to move relative to the second robot arm link.

The attaching of the at least one vibration damper arrangement to the frame of a first robot arm link may comprise sandwiching the at least one viscoelastic element against a surface of the frame of the first robot arm link by a plate of the connection being attached to the frame of the first robot arm link to clamp the at least one viscoelastic element against the surface of the frame of the first robot arm link.

An example method may comprise moving a first robot arm link relative to a second robot arm link, where the first robot arm link comprises a frame having a first end movably connected to the second robot arm link; and damping vibrations in the frame of the first robot arm link comprising at least one vibration damper arrangement on the frame of the first robot arm link including at least one viscoelastic element connected to the frame of the first robot arm link by a connection such that, as the frame of the first robot arm link experiences vibrations, the at least one viscoelastic element dampens the vibrations in the frame of the first robot arm link based upon viscoelasticity and the connection of the at least one viscoelastic element to the frame of the first robot arm link.

An example embodiment may be provided in an apparatus comprising a first robot arm link; and a second robot arm link, movably connected to the first robot arm link, where the second robot arm link comprises a frame member having a first end movably connected to the first robot arm link and an opposite second end connected to another member, where the frame member comprises a plurality of viscoelastic elements located inside a core of the frame member, where the plurality of viscoelastic elements are at least partially embedded inside the core, where the core has been at least partially molded or cast onto the plurality of viscoelastic elements to thereby form a connection between the plurality of viscoelastic elements and the core such that, as the core experiences vibrations, the at least one viscoelastic element dampens the vibrations in the core based upon viscoelasticity and the connection of the at least one viscoelastic element to the core.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:
1. An apparatus comprising:
   a plurality of robot arm links movably connected to one another, where a first one of the robot arm links comprises a frame, where the frame has a first end movably connected onto a second one of the robot arm links; and
   at least one vibration damper arrangement on the frame of the first robot arm link, where the at least one vibration damper arrangement comprises at least one viscoelastic element connected to the frame of the first robot arm link by a first connection such that, as the frame of the first robot arm link experiences vibrations, the at least one viscoelastic element dampens the vibrations in the frame of the first robot arm link based upon viscoelasticity and the first connection of the at least one viscoelastic element to the frame of the first robot arm link, where the at least one viscoelastic element is attached to the frame of the first robot arm link by the first connection inside the frame of the first robot arm link such that the at least one viscoelastic element is spaced from a second connection of the first robot arm link with other of the plurality of robot arm links, and where the at least one viscoelastic element is configured to viscoelasticly deform on the frame based upon flexing deformation of the frame on the at least one viscoelastic element, where the first connection comprises at least one fastener which clamps the at least one viscoelastic element onto a portion of the frame of the first robot arm link.

2. The apparatus as claimed in claim 1 where the at least one viscoelastic element comprises at least two of the viscoelastic elements which are clamped onto opposite sides of the portion of the frame of the first robot arm link.

3. The apparatus as claimed in claim 2 where the first connection comprises plates which sandwich the at least two viscoelastic elements against opposite sides of the portion of the frame of the first robot arm link.

4. The apparatus as claimed in claim 3 where the portion of the frame of the first robot arm link has apertures for the fasteners to extend through.

5. The apparatus as claimed in claim 4 further comprising at least one viscoelastic sleeve located in at least one of the apertures between the frame of the first robot arm link and the fastener.

6. The apparatus as claimed in claim 3 where the plates comprises a general U-shaped section.

7. The apparatus as claimed in claim 1 where the portion extends in an inward direction inside the frame of the first robot arm link, where the first robot arm link comprises one of:
   an upper arm,
   a forearm,
   an end effector, or
   a portion of a link between the forearm and the end effector.

8. The apparatus as claimed in claim 1 where the first connection further comprises at least one plate which is compressed against the at least one viscoelastic element by the at least one fastener such that the at least one plate presses the at least one viscoelastic element against a portion of the frame of the first robot arm link.

9. The apparatus as claimed in claim 8 where the at least one viscoelastic element comprises a first plate-shaped member comprised of viscoelastic material and at least one second sleeve-shaped member comprised of viscoelastic material, where the at least one second sleeve shaped member is located around at least one of the at least one fastener.

10. An apparatus comprising:
a plurality of robot arm links movably connected to one another, where a first one of the robot arm links comprises a frame, where the frame has a first end movably connected onto a second one of the robot arm links; and
at least one vibration damper arrangement on the frame of the first robot arm link, where the at least one vibration damper arrangement comprises at least one viscoelastic element connected to the frame of the first robot arm link by a first connection such that, as the frame of the first robot arm link experiences vibrations, the at least one viscoelastic element dampens the vibrations in the frame of the first robot arm link based upon viscoelasticity and the first connection of the at least one viscoelastic element to the frame of the first robot arm link, where the at least one viscoelastic element is attached to the frame of the first robot arm link by the first connection inside the frame of the first robot arm link such that the at least one viscoelastic element is spaced from a second connection of the first robot arm link with other of the plurality of robot arm links, and where the at least one viscoelastic element is configured to viscoelasticly deform on the frame based upon flexing deformation of the frame on the at least one viscoelastic element,
where the first connection further comprises at least one plate which is compressed against the at least one viscoelastic element to press the at least one viscoelastic element against a portion of the frame of the first robot arm link, where the at least one plate comprises a first plate comprising a fastener contact area connected to a rest of the first plate by at least one bendable flexure portion of the first plate.

11. An apparatus comprising:
a plurality of robot arm links movably connected to one another, where a first one of the robot arm links comprises a frame, where the frame has a first end movably connected onto a second one of the robot arm links; and
at least one vibration damper arrangement on the frame of the first robot arm link, where the at least one vibration damper arrangement comprises at least one viscoelastic element connected to the frame of the first robot arm link by a first connection such that, as the frame of the first robot arm link experiences vibrations, the at least one viscoelastic element dampens the vibrations in the frame of the first robot arm link based upon viscoelasticity and the first connection of the at least one viscoelastic element to the frame of the first robot arm link, where the at least one viscoelastic element is attached to the frame of the first robot arm link by the first connection inside the frame of the first robot arm link such that the at least one viscoelastic element is spaced from a second connection of the first robot arm link with other of the plurality of robot arm links, and where the at least one viscoelastic element is configured to viscoelasticly deform on the frame based upon flexing deformation of the frame on the at least one viscoelastic element,
where the at least one viscoelastic element comprises a first plate-shaped member comprised of viscoelastic material and a second plate-shaped member comprised of viscoelastic material which are located on opposite sides of a portion of the frame of the first robot arm link.

12. An apparatus comprising:
a plurality of robot arm links movably connected to one another, where a first one of the robot arm links comprises a frame, where the frame has a first end movably connected onto a second one of the robot arm links; and
at least one vibration damper arrangement on the frame of the first robot arm link, where the at least one vibration damper arrangement comprises at least one viscoelastic element connected to the frame of the first robot arm link by a first connection such that, as the frame of the first robot arm link experiences vibrations, the at least one viscoelastic element dampens the vibrations in the frame of the first robot arm link based upon viscoelasticity and the first connection of the at least one viscoelastic element to the frame of the first robot arm link, where the at least one viscoelastic element is attached to the frame of the first robot arm link by the first connection inside the frame of the first robot arm link such that the at least one viscoelastic element is spaced from a second connection of the first robot arm link with other of the plurality of robot arm links, and where the at least one viscoelastic element is configured to viscoelasticly deform on the frame based upon flexing deformation of the frame on the at least one viscoelastic element, where the first connection comprises a plate which sandwiches the at least one viscoelastic element against a flat surface of a portion of the frame of the first robot arm link.

13. An apparatus comprising:
a plurality of robot arm links movably connected to one another, where a first one of the robot arm links comprises a frame, where the frame has a first end movably connected onto a second one of the robot arm links; and
at least one vibration damper arrangement on the frame of the first robot arm link, where the at least one vibration damper arrangement comprises at least one viscoelastic element connected to the frame of the first robot arm link by a first connection such that, as the frame of the first robot arm link experiences vibrations, the at least one viscoelastic element dampens the vibrations in the frame of the first robot arm link based upon viscoelasticity and the first connection of the at least one viscoelastic element to the frame of the first robot arm link, where the at least one viscoelastic element is attached to the frame of the first robot arm link by the first connection inside the frame of the first robot arm link such that the at least one viscoelastic element is spaced from a second connection of the first robot arm link with other of the plurality of robot arm links, and where the at least one viscoelastic element is configured to viscoelasticly deform on the frame based upon flexing deformation of the frame on the at least one viscoelastic element,
where the at least one viscoelastic element has apertures, and the first connection comprises fasteners which extend through the apertures into a portion of the frame of the first robot arm link.

14. An apparatus comprising:
a plurality of robot arm links movably connected to one another, where a first one of the robot arm links comprises a frame, where the frame has a first end movably connected onto a second one of the robot arm links; and
at least one vibration damper arrangement on the frame of the first robot arm link, where the at least one vibration damper arrangement comprises at least one viscoelastic element connected to the frame of the first robot arm link by a first connection such that, as the frame of the first robot arm link experiences vibrations, the at least one viscoelastic element dampens the vibrations in the frame of the first robot arm link based upon viscoelasticity and the first connection of the at least one viscoelastic element to the frame of the first robot arm link, where the at least one viscoelastic element is attached to the frame of the first robot arm link by the first connection inside the frame of the first robot arm link such that the at least one viscoelastic element is spaced from a second connection of the first robot arm link with other of the plurality of robot arm links, and where the at least one viscoelastic element is configured to viscoelasticly deform on the frame based upon flexing deformation of the frame on the at least one viscoelastic element,
where the plurality of robot arm links are rotatably connected to one another in series to form a robot arm, where the robot arm further comprises at least one end effector at a first end of the robot arm, and where the apparatus further comprises a drive connected to a second end of the robot arm, where the drive comprises coaxial drive shafts.

15. The apparatus as in claim 14 where the robot arm further comprises belts and pulleys to rotate at least one of the robot arm links and/or the at least one end effector.

16. The apparatus as claimed in claim 1 where the at least one viscoelastic element comprises a first viscoelastic element on a first side of the frame, a second viscoelastic element on an opposite side of the frame, and fasteners extending through the frame and clamping the first and second viscoelastic element against the first and second sides of the frame.

17. An apparatus comprising:
a plurality of robot arm links movably connected to one another, where a first one of the robot arm links comprises a first frame, where the first frame has a first end rotatably connected to a second frame of a second one of the robot arm links at a rotatable connection; and
at least one vibration damper arrangement on the first frame, where the at least one vibration damper arrangement comprises at least one viscoelastic element connected to the first frame by an attaching connection spaced from the rotatable connection, where the at least one viscoelastic element is configured to dampen vibrations in the first frame, based upon flexing deformation of the first frame, with use of viscoelasticity and the attaching connection of the at least one viscoelastic element to the first frame, where the at least one viscoelastic element is attached to the first frame of the first robot arm link, inside the first frame of the first robot arm link, by the attaching connection such that the at least one viscoelastic element is spaced from the rotatable connection of the first robot arm link with another one of the plurality of robot arm links,
where the attaching connection further comprises at least one plate which is compressed against the at least one viscoelastic element to press the at least one viscoelastic element against a portion of the first frame of the first robot arm link, where the at least one plate comprises a first plate comprising a fastener contact area connected to a rest of the first plate by at least one bendable flexure portion of the first plate.

18. The apparatus as in claim 17 where the at least one viscoelastic element comprises a first viscoelastic element on a first side of the first frame, a second viscoelastic element on an opposite second side of the first frame, and fasteners extending through the first frame and clamping the first and second viscoelastic element against the first and second sides of the first frame.

19. An apparatus comprising:
a plurality of robot arm links movably connected to one another, where a first one of the robot arm links comprises a frame, where the frame has a first end movably connected onto a second one of the robot arm links; and
at least one vibration damper arrangement on the frame of the first robot arm link, where the at least one vibration damper arrangement comprises at least one viscoelastic element connected to the frame of the first robot arm link by an attaching connection such that, as the frame of the first robot arm link experiences vibrations, the at least one viscoelastic element is configured to dampen the vibrations in the frame of the first robot arm link based upon viscoelasticity and the attaching connection of the at least one viscoelastic element to the frame of the first robot arm link, where the at least one viscoelastic element is attached to the frame of the first robot arm link, inside the frame of the first robot arm link, by the attaching connection such that the at least one viscoelastic element is spaced from a rotatable connection of the first robot arm link with other of the plurality of robot arm links, where the at least one viscoelastic element comprises a first viscoelastic element on a first side of a first portion of the frame, a second viscoelastic element on an opposite second side of the first portion of the frame, and the attaching connection comprises fasteners extending through the first portion of the frame and clamping the first and second viscoelastic element against the first and second sides of the first portion of the frame.

\* \* \* \* \*